(12) United States Patent
Gunther

(10) Patent No.: US 11,007,637 B2
(45) Date of Patent: May 18, 2021

(54) SPHERICAL MECHANISM ROBOT ASSEMBLY, SYSTEM, AND METHOD FOR ACCESSING A CONFINED SPACE IN A VEHICLE TO PERFORM CONFINED SPACE OPERATIONS

(71) Applicant: The Boeing Company, Chicago, IL (US)

(72) Inventor: Scott W. Gunther, Bothell, WA (US)

(73) Assignee: The Boeing Company, Chicago, IL (US)

( * ) Notice: Subject to any disclaimer, the term of this patent is extended or adjusted under 35 U.S.C. 154(b) by 258 days.

(21) Appl. No.: 16/416,145

(22) Filed: May 17, 2019

(65) Prior Publication Data

US 2020/0361079 A1    Nov. 19, 2020

(51) Int. Cl.
*B25J 9/00*     (2006.01)
*B25J 11/00*    (2006.01)
(Continued)

(52) U.S. Cl.
CPC ........... *B25J 9/0096* (2013.01); *B25J 11/005* (2013.01); *B25J 11/007* (2013.01);
(Continued)

(58) Field of Classification Search
CPC ...... B25J 9/0096; B25J 11/005; B25J 11/007; B25J 11/0075; B25J 15/0019;
(Continued)

(56) References Cited

U.S. PATENT DOCUMENTS 5,307,447 A * 4/1994 Asano ................. B25J 5/02
                                                     348/E7.088
6,668,466 B1 * 12/2003 Bieg .................. G01B 5/008
                                                     33/1 PT
(Continued)

OTHER PUBLICATIONS

S. Gunther et al., "The Red Dragon: A Multi-Modality System for Simulation and Training in Minimally Invasive Surgery," Medicine Meets Virtual Reality 15, Long Beach, CA, 2007, J.D. Weswood et. Al. (Eds.), IOS Press, 2007, pp. 149-154.
(Continued)

*Primary Examiner* — Jermie E Cozart

(57) ABSTRACT

There is provided a spherical mechanism robot assembly for accessing a confined space in a vehicle, to perform confined space operation(s) in the vehicle. The assembly includes a base structure configured for attachment to the vehicle. The assembly includes a spherical mechanism structure having a first end attached to the base structure, and having a second end. The spherical mechanism structure includes a plurality of mechanical links, joints coupling the plurality of mechanical links together, and a plurality of actuators having one or more actuators coupled at each joint of the plurality of joints. The assembly includes an end effector attached to the second end of the spherical mechanism structure. The assembly is configured such that a majority portion remains outside of the confined space, while a remaining portion of the assembly accesses and occupies the confined space in the vehicle, to perform the confined space operation(s) in the vehicle.

20 Claims, 18 Drawing Sheets

(51) Int. Cl.
  *B25J 15/00*   (2006.01)
  *B25J 19/00*   (2006.01)
  *B25J 17/02*   (2006.01)
  *B64D 47/00*   (2006.01)

(52) U.S. Cl.
  CPC ....... *B25J 11/0075* (2013.01); *B25J 15/0019* (2013.01); *B25J 19/007* (2013.01); *B64D 47/00* (2013.01); *B25J 17/0266* (2013.01); *B25J 17/0283* (2013.01)

(58) Field of Classification Search
  CPC .. B25J 17/0266; B25J 17/0283; B25J 19/007; B64D 47/00
  See application file for complete search history.

(56) References Cited

U.S. PATENT DOCUMENTS

| | | | |
|---|---|---|---|
| 8,972,057 | B1 | 3/2015 | Freeman et al. |
| 9,580,120 | B2 | 2/2017 | Podnar |
| 9,610,693 | B2 | 4/2017 | Sarh et al. |
| 9,764,464 | B2 | 9/2017 | Sarh et al. |
| 9,962,834 | B2 | 5/2018 | Stone et al. |
| 10,023,250 | B2 | 7/2018 | Podnar |
| 2006/0243085 | A1 | 11/2006 | Hannaford et al. |
| 2011/0020779 | A1 | 1/2011 | Hannaford et al. |
| 2013/0031764 | A1 | 2/2013 | Sarh et al. |
| 2013/0185925 | A1 | 7/2013 | Sarh et al. |
| 2015/0375390 | A1* | 12/2015 | Becroft ............... B24B 27/0007 427/427.2 |
| 2016/0368144 | A1 | 12/2016 | Stone et al. |
| 2017/0312923 | A1* | 11/2017 | Erickson .................. B25J 18/02 |
| 2017/0348852 | A1 | 12/2017 | Sarh et al. |
| 2017/0355080 | A1 | 12/2017 | Podnar |

OTHER PUBLICATIONS

M. Lum et al., "Kinematic Optimization of a Spherical Mechanism for a Minimally Invasive Surgical Robot", Proceedings of the 2004 IEEE International Conference on Robotics & Automation, New Orleans, LA, Apr. 2004, pp. 829-834.

J. Rosen et al., "The Blue Dragon—A System for Measuring the Kinematics and Dynamics of Minimally Invasive Surgical Tools In-Vivo", Proceedings of the 2002 IEEE International Conference on Robotics & Automation, Washington, DC, May 2002, pp. 1876-1881.

* cited by examiner

SPHERICAL MECHANISM ROBOT ASSEMBLY, SYSTEM, AND METHOD FOR ACCESSING A CONFINED SPACE IN A VEHICLE TO PERFORM CONFINED SPACE OPERATIONS

FIELD

The disclosure relates generally to robot assemblies, systems, and methods used in aircraft manufacturing, and more particularly, to robot assemblies, systems, and methods used for aircraft assembly operations in confined spaces in vehicles, such as aircraft.

BACKGROUND

In the manufacture and assembly of vehicles, such as aircraft, various operations including fastening operations, drilling operations, sealing operations, inspecting operations, and other types of operations, are typically performed. Such operations may require accessing confined spaces, for example, inside an aircraft wing, inside a horizontal stabilizer, inside a vertical stabilizer, or inside another aircraft structure.

A known method for performing such confined space operations in a vehicle, such as an aircraft, includes a human operator accessing the aircraft structure through an access port formed in the aircraft structure, the human operator crawling into an interior of a confined space in the aircraft structure, and the human operator manually performing the confined space operations. However, such known method may be time consuming and may affect build rates. Moreover, such known method may have ergonomic challenges. In addition, for aircraft with small wings, such known method may not allow the human operator to access the interior of the confined space due to space and size constraints within the confined space.

Other known systems and methods for performing such confined space operations in vehicles, such as aircraft, include the use of large robot assemblies to access the interior of a confined space in the aircraft structure through the access port, and to automatically or robotically perform the confined space operations. However, such known large robot assemblies may be bulky and may require large systems to be positioned on the mechanical links, hinged joints, and actuators inside the confined space in the aircraft structure. With a considerable amount of equipment of the robot assembly required to be inside the confined space, it may be difficult to navigate past support structures, such as stringers, to perform operations inside the confined space, and it may be difficult positioning the robot assembly within the confined space. Moreover, such known large robot assemblies may be very heavy (i.e., greater than 50-100 pounds), and may be difficult to manually lift, or may require additional lift equipment to move the robot assemblies to the aircraft structure.

Accordingly, there is a need in the art for an assembly, system, and method for robotically and automatically accessing a confined space in a vehicle, to perform one or more confined space operations in a vehicle, such as an aircraft, that avoid the need for human operators to crawl into a confined space and perform the confined space operations, that are lightweight, that have a majority portion of the assembly outside of the confined space, and that provide advantages over known assemblies, systems, and methods.

SUMMARY

Example implementations of this disclosure provide a spherical mechanism robot assembly, system, and method for accessing a confined space in a vehicle, such as an aircraft, to perform one or more confined space operations in the vehicle, such as the aircraft, and provide significant advantages over known assemblies, systems, and methods.

In one version of the disclosure, there is provided a spherical mechanism robot assembly for accessing a confined space in a vehicle, to perform one or more confined space operations in the vehicle. The spherical mechanism robot assembly comprises a base structure configured for attachment to the vehicle.

The spherical mechanism robot assembly further comprises a spherical mechanism structure having a first end attached to the base structure, and having a second end. The spherical mechanism structure comprises a plurality of mechanical links, a plurality of joints coupling the plurality of mechanical links together, and a plurality of actuators comprising one or more actuators coupled at each joint of the plurality of joints.

The spherical mechanism robot assembly further comprises an end effector attached to the second end of the spherical mechanism structure. The base structure, the spherical mechanism structure, and the end effector are assembled to form the spherical mechanism robot assembly, with the spherical mechanism robot assembly configured such that a majority portion of the spherical mechanism robot assembly remains outside of the confined space, while a remaining portion of the spherical mechanism robot assembly accesses and occupies the confined space in the vehicle, to perform the one or more confined space operations in the vehicle.

In another version of the disclosure, there is provided a spherical mechanism robot system for accessing a confined space in an aircraft, to perform one or more confined space operations in the aircraft.

The spherical mechanism robot system comprises a spherical mechanism robot assembly. The spherical mechanism robot assembly comprises a base structure configured for attachment to an access port in the aircraft. The spherical mechanism robot assembly further comprises a spherical mechanism structure having a first end attached to the base structure, and having a second end. The spherical mechanism structure comprises a plurality of mechanical links, a plurality of hinged joints coupling the plurality of mechanical links together, and a plurality of actuators with one or more actuators coupled at each hinged joint of the plurality of hinged joints. The spherical mechanism robot assembly further comprises an end effector attached to the second end of the spherical mechanism structure.

The spherical mechanism robot system further comprises a tool configured for attachment to the end effector. The spherical mechanism robot system further comprises a control and power system coupled to the spherical mechanism robot assembly. The control and power system operates and positions the spherical mechanism robot assembly in a plurality of positions with respect to the access port and the confined space. The spherical mechanism robot system enables the spherical mechanism robot assembly to access an interior of the confined space in the aircraft, and the spherical mechanism robot assembly is configured such that a majority portion of the spherical mechanism robot assembly remains outside of the confined space, while a remaining portion of the spherical mechanism robot assembly accesses and occupies the confined space in the aircraft, to perform the one or more confined space operations in the aircraft.

In another version there is provided a method for accessing a confined space in a vehicle, to perform one or more confined space operations in the vehicle. The method comprises the step of attaching a spherical mechanism robot assembly to an opening in the vehicle. The opening provides access into an interior of the confined space in the vehicle.

The spherical mechanism robot assembly comprises a base structure configured for attachment to the opening. The spherical mechanism robot assembly further comprises a spherical mechanism structure having a first end attached to the base structure, and having a second end. The spherical mechanism structure comprises a plurality of mechanical links, a plurality of joints coupling the plurality of mechanical links together, and a plurality of actuators comprising one or more actuators coupled at each joint of the plurality of joints. The spherical mechanism robot assembly further comprises an end effector attached to the second end of the spherical mechanism structure.

The method further comprises the step of operating and positioning the spherical mechanism robot assembly, with a control and power system coupled to the spherical mechanism robot assembly, to access the interior of the confined space in the vehicle. The method further comprises the step of performing the one or more confined space operations, with the spherical mechanism robot assembly, in the interior of the confined space in the vehicle, with a majority portion of the spherical mechanism robot assembly remaining outside of the confined space, while a remaining portion of the spherical mechanism robot assembly accesses and occupies the interior of the confined space.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings which illustrate exemplary versions or embodiments, but which are not necessarily drawn to scale, wherein.

Figure 1A:
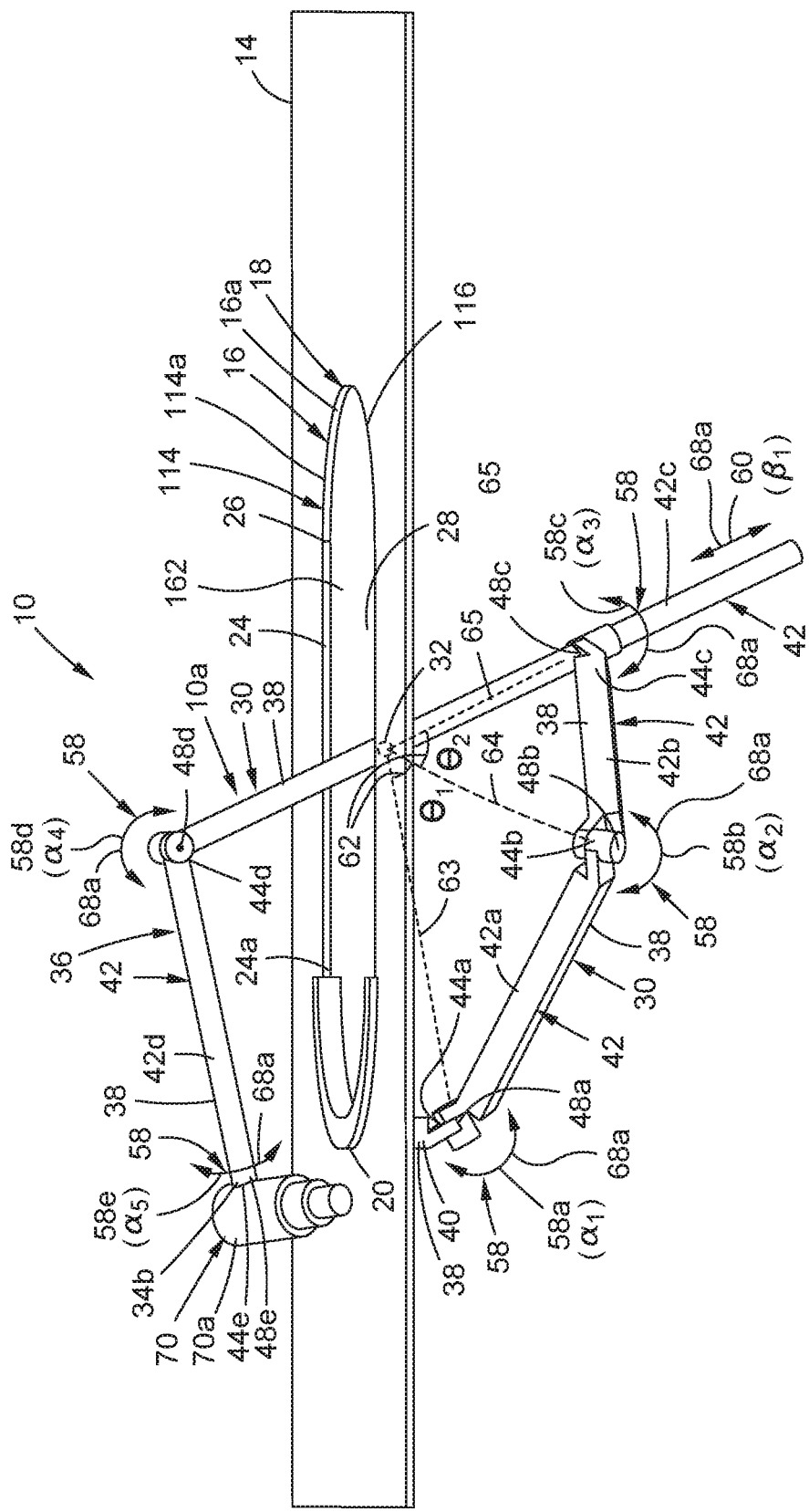
FIG. 1A is an illustration of a front perspective view of a version of a spherical mechanism robot assembly of the disclosure attached to a panel.

Each figure shown in this disclosure shows a variation of an aspect of the versions or examples presented, and only differences will be discussed in detail.

DETAILED DESCRIPTION

Disclosed versions or examples will now be described more fully hereinafter with reference to the accompanying drawings, in which some, but not all of the disclosed versions or examples are shown. Indeed, several different versions may be provided and should not be construed as limited to the versions set forth herein. Rather, these versions are provided so that this disclosure will be thorough and fully convey the scope of the disclosure to those skilled in the art.

Now referring to the Figures, FIGS. 1A-1G show various views of a version of the spherical mechanism robot assembly 10 of the disclosure. FIG. 1H is an illustration of a front perspective exploded view of the spherical mechanism robot assembly 10 of FIG. 1A, that is not attached to the panel 14. In one version of the disclosure, there is provided the spherical mechanism robot assembly 10 (see FIGS. 1A-1H) for accessing an interior 122 (see FIGS. 8A-8C) of a confined space 86 (see FIGS. 8A-8C) in a vehicle 80 (see FIG. 8A), such as an aircraft 82a (see FIG. 8A), to perform, or to be configured to perform, one or more confined space operations 88 (see FIG. 10) in the vehicle 80.

Figure 1B:
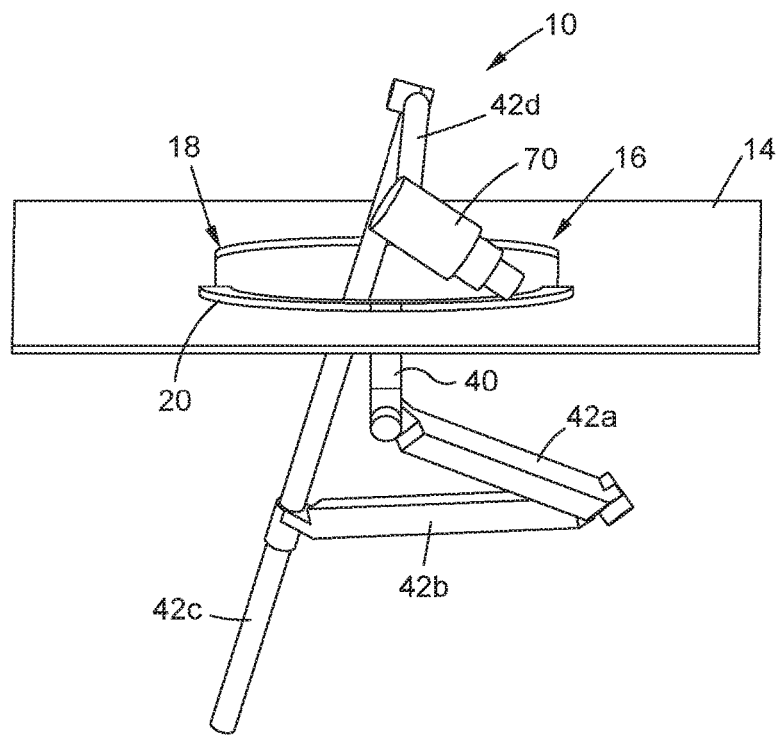
FIG. 1B is an illustration of a left side perspective view of the spherical mechanism robot assembly of FIG. 1A, attached to the panel.
Figure 1C:
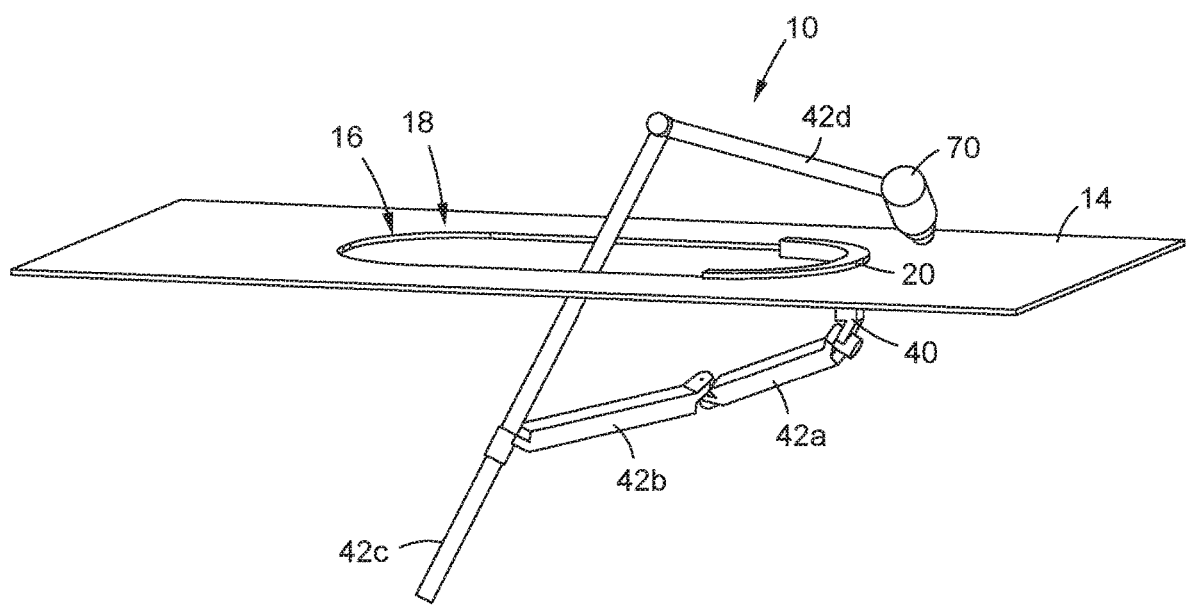
FIG. 1C is an illustration of a back perspective view of the spherical mechanism robot assembly of FIG. 1A, attached to the panel.
Figure 1D:
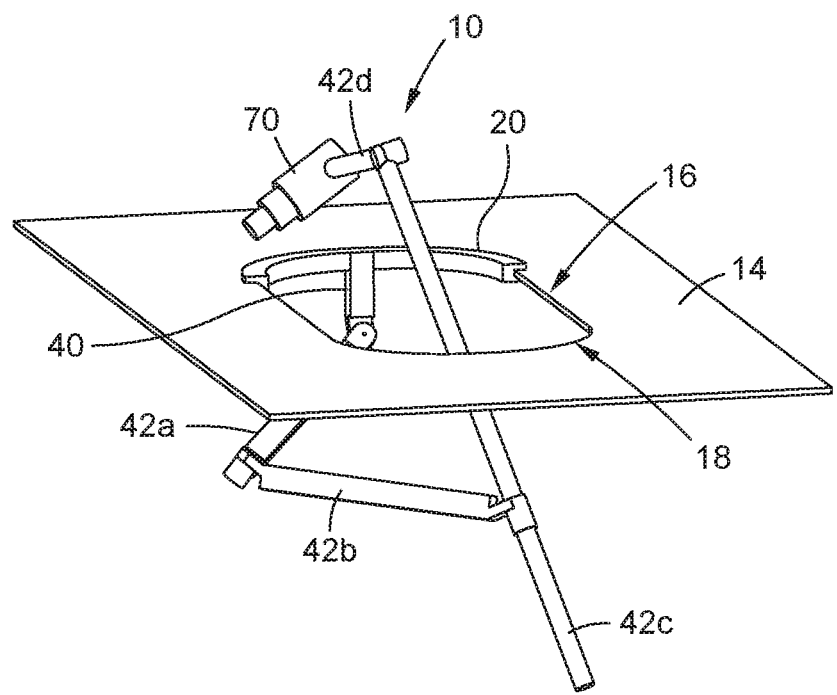
FIG. 1D is an illustration of a right side perspective view of the spherical mechanism robot assembly of FIG. 1A, attached to the panel.
Figure 1E:
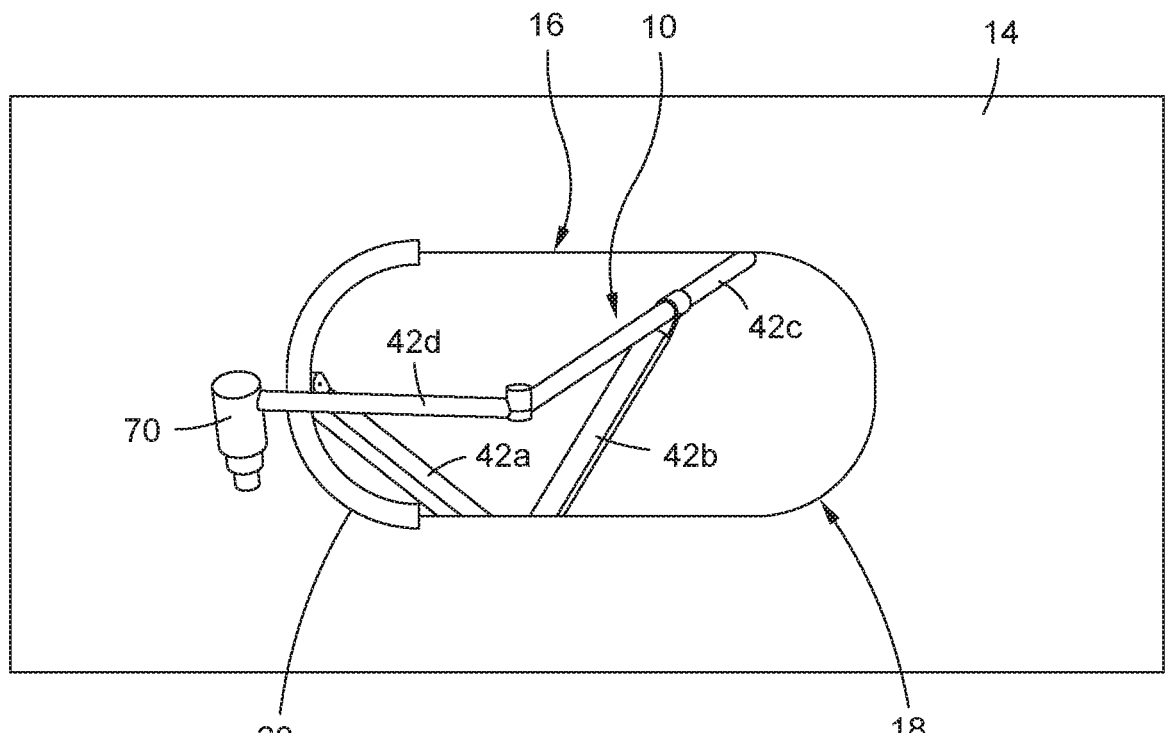
FIG. 1E is an illustration of a top perspective view of the spherical mechanism robot assembly of FIG. 1A, attached to the panel.
Figure 1F:
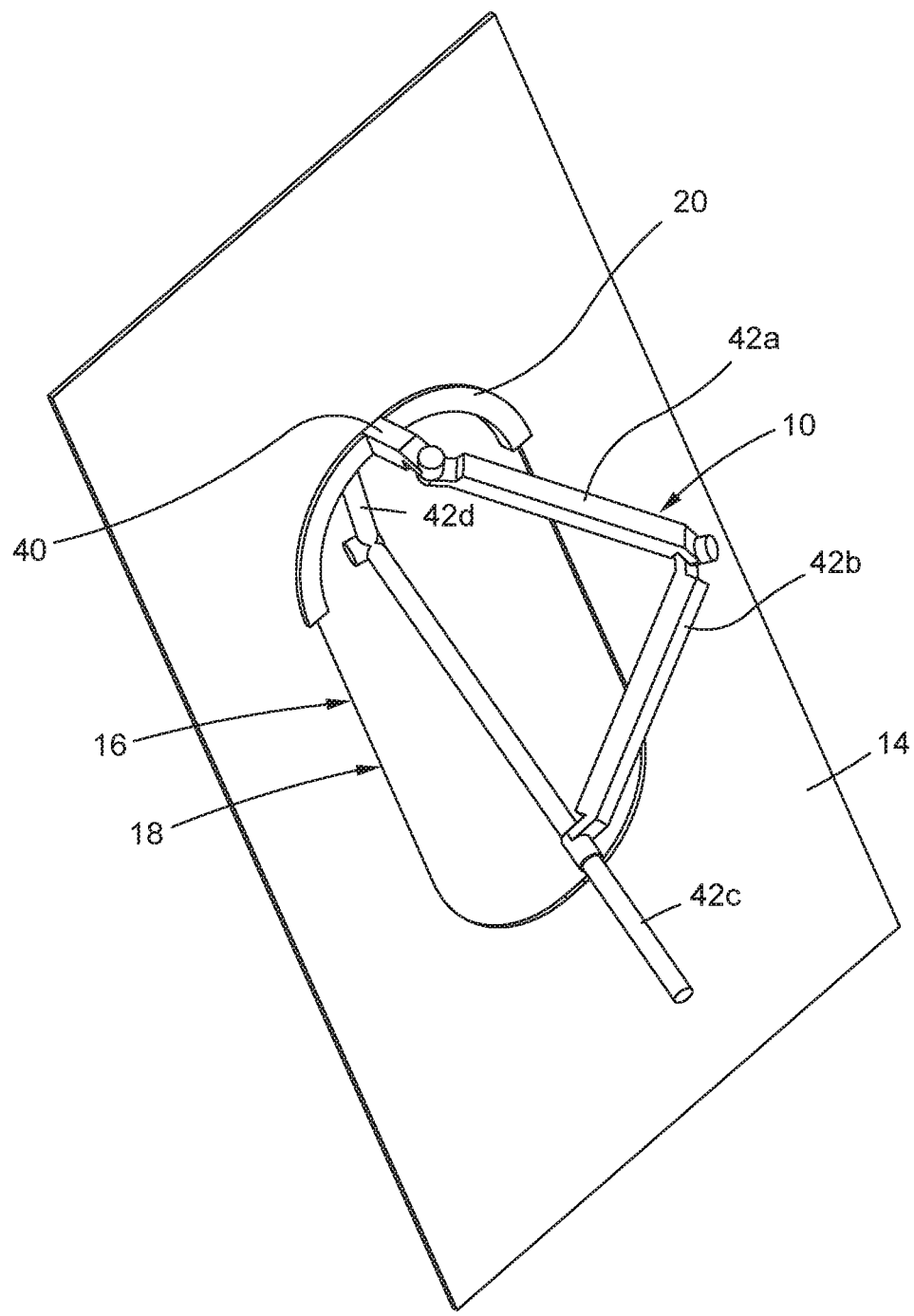
FIG. 1F is an illustration of a bottom perspective view of the spherical mechanism robot assembly of FIG. 1A, attached to the panel.
Figure 1G:
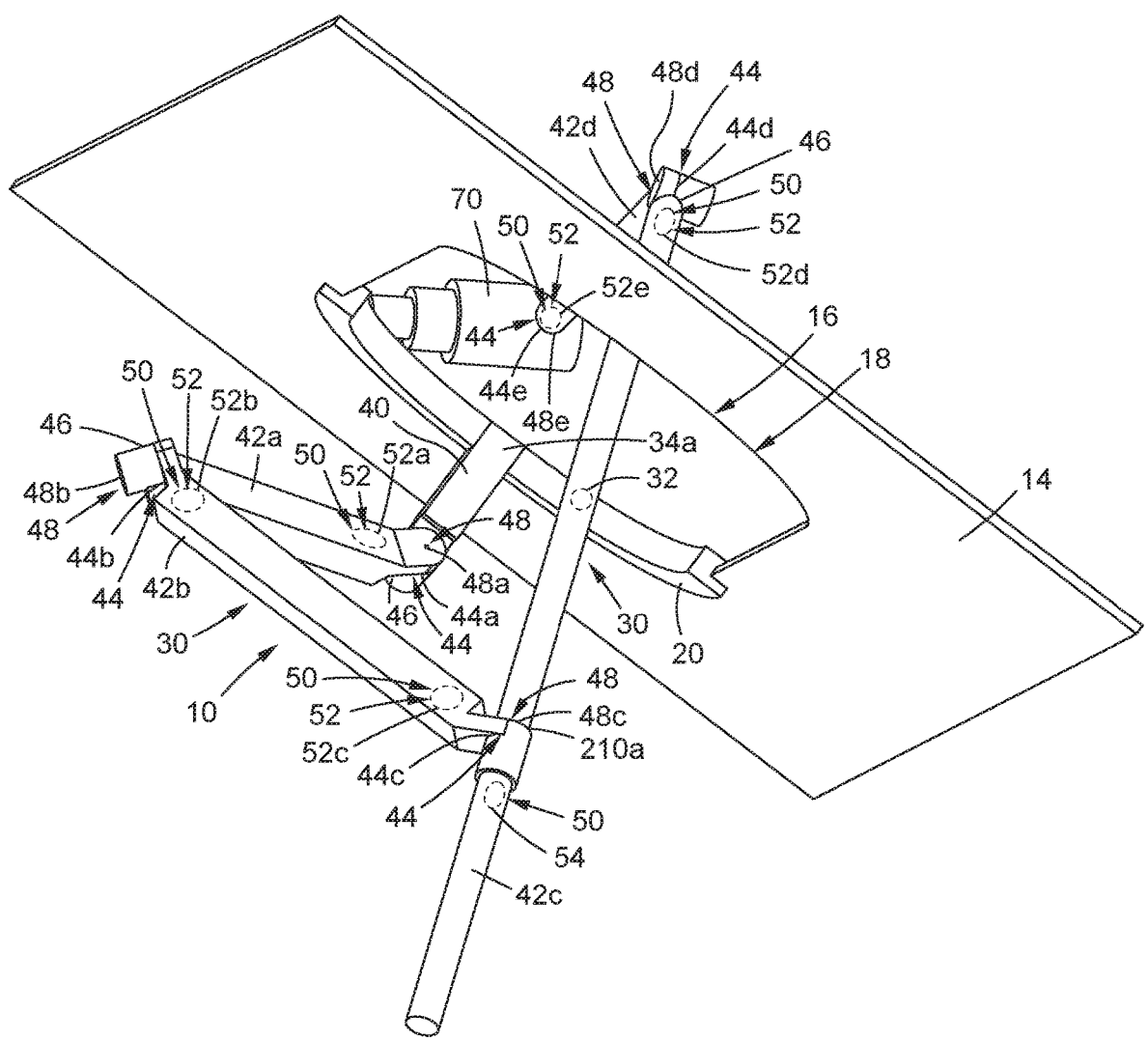
FIG. 1G is an illustration of a right side bottom perspective view of the spherical mechanism robot assembly of FIG. 1A, attached to the panel.
Figure 1H:
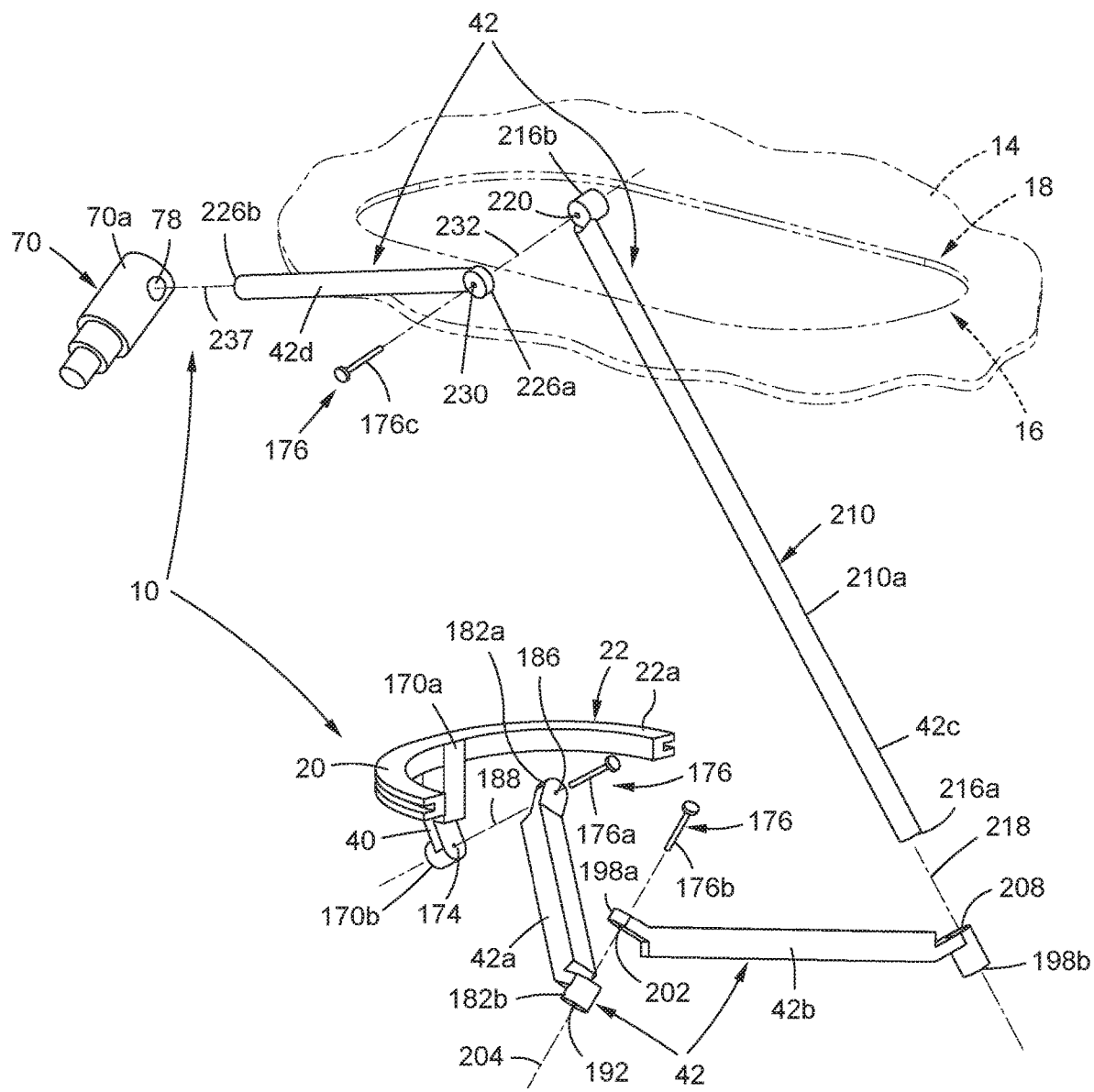
FIG. 1H is an illustration of a front perspective exploded view of the spherical mechanism robot assembly of FIG. 1A, that is not attached to the panel.

FIGS. 1A-1G show a version of the spherical mechanism robot assembly 10 attached to a panel 14 and partially inserted through an opening 16, such as an access port 18, in the panel 14. FIG. 1A is an illustration of a front perspective view of the spherical mechanism robot assembly 10 of the disclosure attached to the panel 14. FIG. 1B is an illustration of a left side perspective view of the spherical mechanism robot assembly 10 of FIG. 1A, attached to the panel 14. FIG. 1C is an illustration of a back perspective view of the spherical mechanism robot assembly 10 of FIG. 1A, attached to the panel 14. FIG. 1D is an illustration of a right side perspective view of the spherical mechanism robot assembly 10 of FIG. 1A, attached to the panel 14. FIG. 1E is an illustration of a top perspective view of the spherical mechanism robot assembly 10 of FIG. 1A, attached to the panel 14. FIG. 1F is an illustration of a bottom perspective view of the spherical mechanism robot assembly 10 of FIG. 1A, attached to the panel 14. FIG. 1G is an illustration of a right side bottom perspective view of the spherical mechanism robot assembly 10 of FIG. 1A, attached to the panel 14.

As shown in FIGS. 1A-1H, the spherical mechanism robot assembly 10 comprises a base structure 20. In one illustrative example, as shown in FIGS. 1H, and 2A-2C, the base structure 20 comprises an attachment device 22, such as in the form of a clamp device 22a. Alternatively, the base structure 20 may comprise another suitable attachment device. The base structure 20 (see FIGS. 1A, 8A) is configured for attachment to the vehicle 80 (see FIG. 8A). The base structure 20, such as the clamp device 22a, enables the spherical mechanism robot assembly 10 to be positioned accurately to take advantage of the system kinematics of the spherical mechanism robot assembly 10 relative to the confined space 86.

As shown in FIG. 1A, the base structure 20 may be clamped to the opening 16, such as the access port 18, of the panel 14. Preferably, as shown in FIG. 1A, the base structure 20 is clamped to an edge portion 24a of an edge 24 formed along a perimeter 26 of the opening 16 of the panel 14. The base structure 20 is preferably rigid in structure and not flexible, so that the spherical mechanism robot assembly 10 is securely held or fixed to the edge portion 24a of the edge 24 of the opening 16. The opening 16 preferably comprises a through opening 16a (see FIG. 1A) that allows a portion 10a (see FIGS. 1A, 8C) of the spherical mechanism robot assembly 10 to be inserted through the opening 16. The opening 16, such as the access port 18, lies in a geometric plane 28 (see FIG. 1A). The opening 16, such as the access port 18, may have a shape 114 (see FIG. 1A) comprising an oval shape 114a (see FIG. 1A), and has a size 116 (see FIG. 1A). However, the shape 114 of the opening 16 may be of another suitable shape. As shown in FIG. 1A, the spherical mechanism robot assembly 10 further comprises a spherical mechanism structure 30. The spherical mechanism structure 30 has a spherical mechanism pivot point 32 (see FIGS. 1A, 1G) positioned in the geometric plane 28 (see FIG. 1A) of the opening 16 (see FIG. 1A), such as the access port 18 (see FIG. 1A). Rotation axes 63, 64, 65 (see FIG. 1A) of the spherical mechanism structure 30 preferably intersect at the spherical mechanism pivot point 32, to allow the plurality of mechanical links 38 to pivot around the spherical mechanism pivot point 32, relative to each other and to the confined space 86.

Figure 8A:
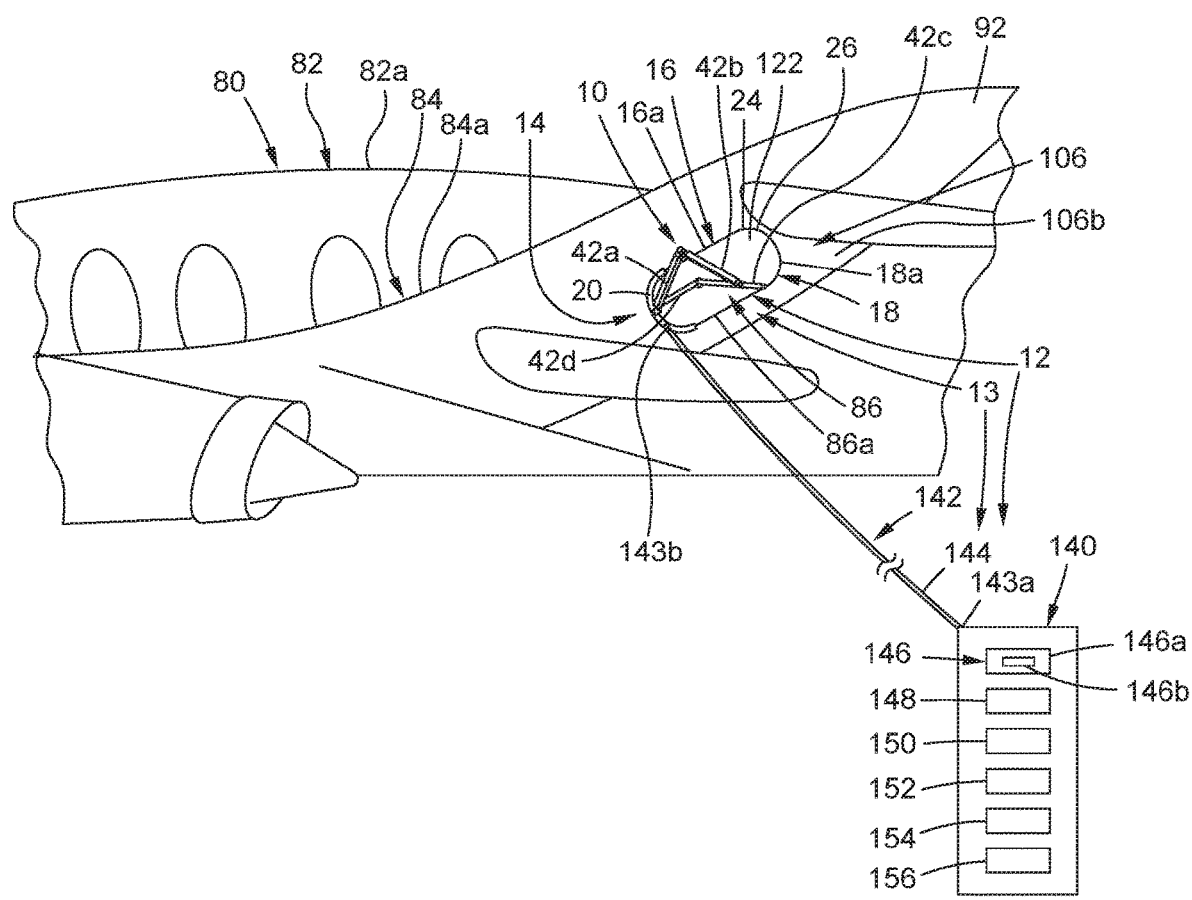
FIG. 8A is an illustration of a bottom perspective view of a version of a spherical mechanism robot system coupled to an access port of an aircraft wing.
Figure 8B:
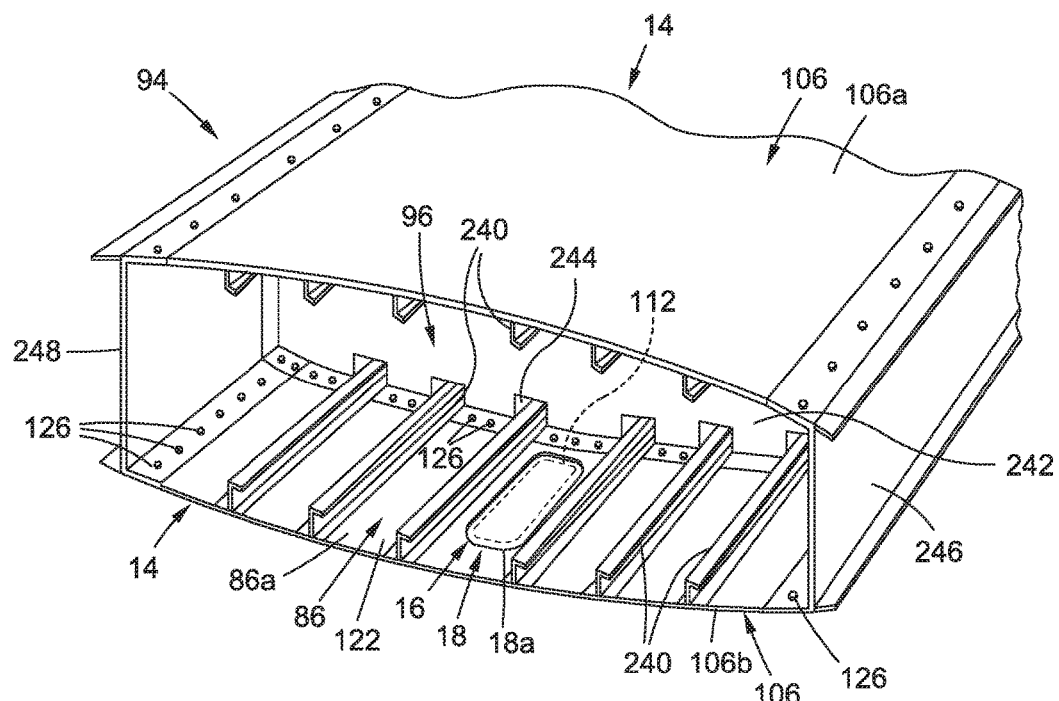
FIG. 8B is an illustration of a side perspective view of a wingbox of an aircraft wing of an aircraft.
Figure 8C:
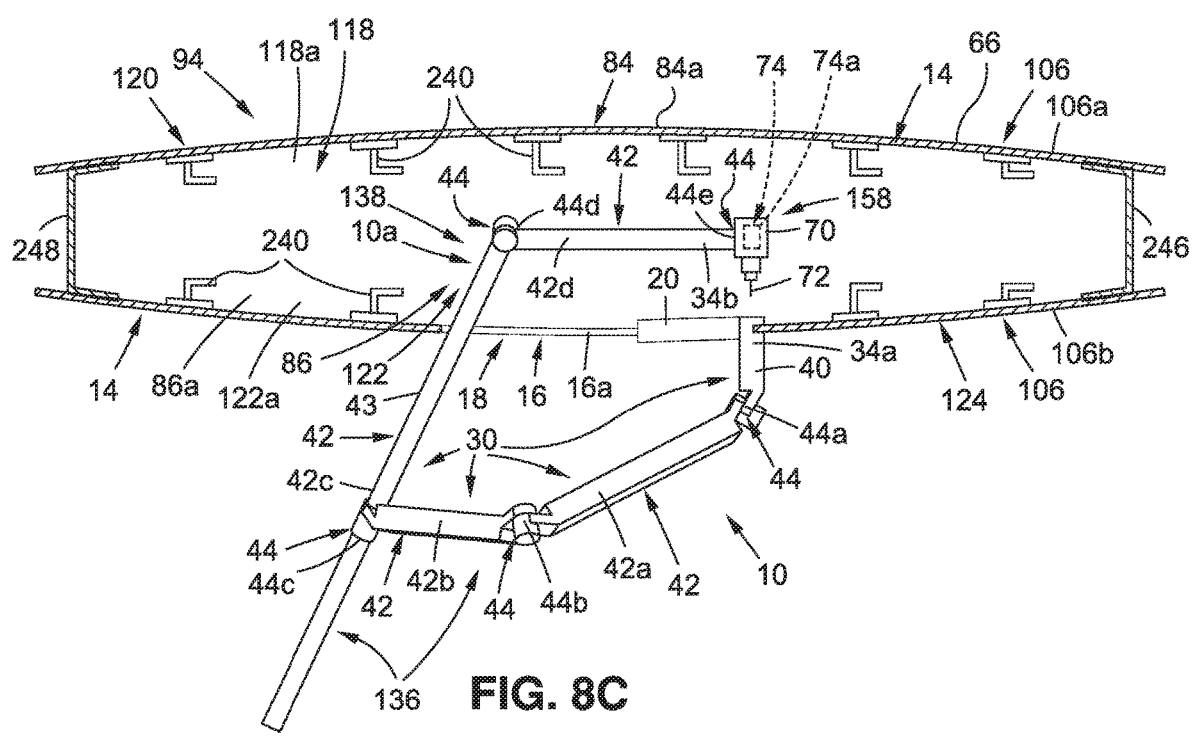
FIG. 8C is an illustration of a cross-sectional view of a wingbox showing a version of a spherical mechanism robot assembly coupled to an access port of the wingbox.

The spherical mechanism structure 30 has a first end 34a (see FIGS. 1G, 8C) and a second end 34b (see FIGS. 1A, 8C). As shown in FIG. 1G, the first end 34a is attached to the base structure 20. The spherical mechanism structure 30 (see FIG. 1A) comprises a kinematic linkage 36 (see FIG. 1A) comprised of a plurality of mechanical links 38 (see FIG. 1A) connected by a plurality of joints 44 (see FIGS. 1A, 1G). Generally, the plurality of mechanical links 38 are the structural elements and the plurality of joints 44 allow movement. The plurality of mechanical links 38 of the spherical mechanism structure 30 are preferably made of a high strength metal material or metal alloy, such as aluminum, steel, aluminum alloy, steel alloy, or another suitable high strength metal material or metal alloy. The high strength metal material used for the plurality of mechanical links 38 is preferably chosen based on weight and rigidity requirements.

The plurality of mechanical links 38 of the spherical mechanism structure 30 preferably comprise a fixed link 40 (see FIGS. 1A-1H) attached to the base structure 20 (see FIGS. 1A-1H), and a plurality of movable links 42 (see FIGS. 1A, 1H). As shown in FIGS. 1A-1H, the plurality of movable links 42 preferably comprise a first movable link 42a, a second movable link 42b, a third movable link 42c, and a fourth movable link 42d. Alternatively, the plurality of movable links 42 may comprise additional movable links, as needed. As shown in FIG. 1A, the first movable link 42a is coupled between the fixed link 40 and the second movable link 42b, the second movable link 42b is coupled between the first movable link 42a and the third movable link 42c, the third movable link 42c is coupled between the second movable link 42b and the fourth movable link 42d, and the fourth movable link 42d is coupled between the third movable link 42c and an end effector 70. Preferably, the fixed link 40 and the plurality of movable links 42 are rigid in structure and not flexible. The plurality of movable links 42 preferably function or operate as articulating arms or pivoting arms As shown in FIGS. 1A and 1G, the spherical mechanism structure 30 of the spherical mechanism robot assembly 10 further comprises a plurality of joints 44 coupling the plurality of mechanical links 38 together. As shown in FIGS. 1A and 1G, the plurality of joints 44 comprise a first joint 44a, a second joint 44b, a third joint 44c, a fourth joint 44d, and a fifth joint 44e. Alternatively, the plurality of joints 44 may comprise additional joints, as needed. Preferably, the plurality of joints 44 comprise a plurality of hinged joints 46 (see FIG. 1G). The hinged joints 46 may also be referred to as revolute joints, rotational joints, or articulated joints. Each of the plurality of joints 44 has a joint pivot point 48 (see FIG. 1G). As shown in FIGS. 1A and 1G, the plurality of joint pivot points 48 comprise a first joint pivot point 48a, a second joint pivot point 48b, a third joint pivot point 48c, a fourth joint pivot point 48d, and a fifth joint pivot point 48e.

As shown in FIG. 1G, the spherical mechanism structure 30 of the spherical mechanism robot assembly 10 further comprises a plurality of actuators 50 comprising one or more actuators 50 coupled at each of the plurality of joints 44, for example, coupled at each of the plurality of joint pivot points 48. Preferably, the spherical mechanism structure 30 of the spherical mechanism robot assembly 10 has six (6) actuators 50. As shown in FIG. 1G, the plurality of actuators 50 preferably comprise a plurality of rotary actuators 52 and at least one linear actuator 54. Preferably, the plurality of actuators 50 comprise five (5) rotary actuators 52 and one (1) linear actuator 54. However, the plurality of actuators 50 may comprise additional actuators, as needed.

The linear actuator 54 (see FIG. 1G) may comprise one of a motor driven linear actuator, a piezoelectric driven linear actuator, a solenoid driven linear actuator, or another suitable type of linear actuator. The linear actuator 54 may be actuated, or moved, via one or a plurality of power supplies 156 (see FIG. 8A), such as an electric power supply, or another suitable actuator power supply.

Each rotary actuator 52 is an actuator that produces a rotary motion or torque. As shown in FIG. 1G, the plurality of rotary actuators 52 may comprise a first rotary actuator 52a, a second rotary actuator 52b, a third rotary actuator 52c, a fourth rotary actuator 52d, and a fifth rotary actuator 52e. Alternatively, the plurality of rotary actuators 52 may comprise additional rotary actuators, as needed. Each rotary actuator 52 may comprise one of, an electric rotary actuator, a rack and pinion rotary actuator, a servomotor rotary actuator, or another suitable rotary actuator. The rotary actuator 52 may be actuated or moved via one of the plurality of power supplies 156 (see FIG. 8A), such as an electric power supply, or another suitable actuator power supply.

The spherical mechanism structure 30 of the spherical mechanism robot assembly 10 preferably has degrees of freedom (DOF), that is, a number of independent parameters or movements that define the configuration of the plurality of mechanical links 38 that are rigid and that are constrained by the plurality of joints 44 connecting the plurality of mechanical links 38 (see FIG. 1A). Preferably, the spherical mechanism structure 30 of the spherical mechanism robot assembly 10 has five (5) degrees of freedom. In an example, the degrees of freedom (DOF) comprise linear degrees of freedom and rotation degrees of freedom.

The plurality of joints 44 and the plurality of actuators 50 each have a rotation actuation 58 (see FIG. 1A), such as rotation degrees of freedom. The first joint 44a (see FIGS. 1A, 1G) and the first rotary actuator 52a (see FIG. 1G) have a first rotation actuation 58a (see FIG. 1A), such as rotation degrees of freedom, of alpha one ($\alpha_1$) (see FIG. 1A). The second joint 44b (see FIGS. 1A, 1G) and the second rotary actuator 52b (see FIG. 1G) have a second rotation actuation 58b (see FIG. 1A), such as rotation degrees of freedom, of alpha two ($\alpha_2$) (see FIG. 1A). The third joint 44c (see FIGS. 1A, 1G) and the third rotary actuator 52c (see FIG. 1G) have a third rotation actuation 58c (see FIG. 1A), such as rotation degrees of freedom, of alpha three ($\alpha_3$) (see FIG. 1A).

The fourth joint 44d (see FIGS. 1A, 1G) and the fourth rotary actuator 52d (see FIG. 1G) have a fourth rotation actuation 58d (see FIG. 1A), such as rotation degrees of freedom, of alpha four ($\alpha_4$) (see FIG. 1A). The fourth rotation actuation 58d, such as rotation degrees of freedom, of alpha four ($\alpha_4$), is an additional degree of freedom to enable or allow operation or performance of the one or more confined space operations 88 (see FIG. 10) on a lower wing skin panel 106b (see FIGS. 8A-8C) of an aircraft wing 92 (see FIG. 8A) of the vehicle 80 (see FIG. 8A), such as the aircraft 82a (see FIG. 8A).

The fifth joint 44e (see FIGS. 1A, 1G) and the fifth rotary actuator 52e (see FIG. 1G) have a fifth rotation actuation 58e (see FIG. 1A), such as rotation degrees of freedom, of alpha five ($\alpha_5$) (see FIG. 1A). The third joint 44c (see FIGS. 1A, 1G) and the third rotary actuator 52c (see FIG. 1G) also have a linear actuation 60 (see FIG. 1A), such as linear degrees of freedom, of beta one ($\beta_1$) (see FIG. 1A). The spherical mechanism structure 30 (see FIG. 1A) of the spherical mechanism robot assembly 10 preferably has two optimized spherical mechanism angles 62 (see FIG. 1A), such as theta one ($\theta_1$) (see FIG. 1A) between a rotation axis 63 (see FIG. 1A) of the first joint 44a and a rotation axis 64 (see FIG. 1A) of the second joint 44b, and such as theta two ($\theta_1$) (see FIG. 1A) between the rotation axis 64 of the second joint 44b and a rotation axis 65 (see FIG. 1A) of the third joint 44c. The rotation axes 63, 64, 65 (see FIG. 1A) of the spherical mechanism structure 30 preferably intersect at the spherical mechanism pivot point 32, to allow the plurality of mechanical links 38 to pivot around the spherical mechanism pivot point 32, relative to each other and to the confined space 86. The spherical mechanism structure 30 (see FIG. 1A) has optimized spherical mechanism angles 62 (see FIG. 1A) between the plurality of mechanical links 38 (see FIG. 1A). As used herein, "optimized spherical mechanism angles" mean angles between rotation axes of a spherical mechanism robot assembly that maximize reach and minimize singularities for a given confined space in which one or more confined space operations are performed, and where "reach" means a maximum working envelope that can be reached by an effector of the spherical mechanism robot assembly, and where "singularities" mean conditions in which the spherical mechanism robot assembly loses one or more degrees of freedom, and change in joint variables does not result in change in end effector location and orientation variables.

In an example, the optimized spherical mechanism angles 62 (see FIG. 1A), such as theta one ($\theta_1$) (see FIG. 1A), for example, 60 (sixty) degrees, and theta two ($\theta_1$) (see FIG. 1A), for example, 45 (forty-five) degrees, are variables that are optimized based on a geometry 66 (see FIG. 8C) of the structure 84 (see FIG. 8C), such as an aircraft structure 84a (see FIG. 8C), that the spherical mechanism robot assembly 10 will be used in, or will perform the one or more confined space operations 88 (see FIG. 10) in or on. The spherical mechanism structure 30 of the spherical mechanism robot assembly 10 preferably allows for complex three-dimensional motions, including rotational motion 68a (see FIG. 1A), and translational motion 68b (see FIG. 1A), or linear motion.

Figure 7A:
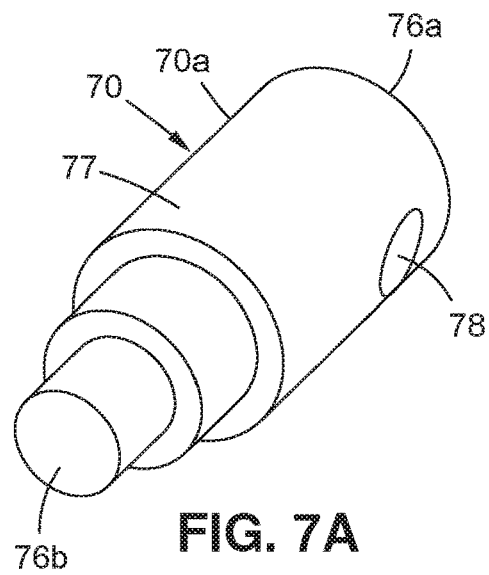
FIGS. 7A-7C are illustrations of an end effector that may be used in a version of a spherical mechanism robot assembly of the disclosure.

As shown in FIGS. 1A-1H, the spherical mechanism robot assembly 10 further comprises an end effector 70 attached to the second end 34b (see FIG. 1A) of the spherical mechanism structure 30. As shown in FIG. 1A, the end effector 70 preferably comprises an interchangeable end effector 70a. In an example, the end effector 70 is attached to a tool 72 (see FIG. 8C). The tool 72 may be changed or modified depending on the type of confined space operations 88 (see FIG. 10) performed, or to be performed, by the spherical mechanism robot assembly 10, and the end effector 70 of the spherical mechanism robot assembly 10. The end effector 70 is preferably attached to the second end 34b (see FIG. 1A) of the spherical mechanism structure 30 with a connector element 74 (see FIG. 8C), such as a quick disconnect connector element 74a (see FIG. 8C). As shown in FIG. 7A, discussed below, the end effector 70 has a first end 76a, a second end 76b, and a body 77 formed between the first end 76a and the second end 76b. As further shown in FIG. 7A, the body 77 has an end effector hole 78 formed in the body 77.

As shown in FIG. 1A, the base structure 20, the spherical mechanism structure 30, and the end effector 70 are assembled to form the spherical mechanism robot assembly 10. The spherical mechanism robot assembly 10 (see FIGS. 1A-1H) is preferably a lightweight and small robotic assembly that may weigh about 30 (thirty) pounds or less in weight, for example, 10 (ten) pounds to thirty (30) pounds. However, the spherical mechanism robot assembly 10 may be another suitable weight depending on the size and shape of the confined space 86 and the size and shape of the structure 84 (see FIG. 8C), such as the aircraft structure 84a

(see FIG. 8C), in which the one or more confined space operations 88 are to be performed.

FIGS. 1A-1G show the base structure 20 of the spherical mechanism robot assembly 10 attached to the opening 16, such as in the form of access port 18, formed in the panel 14. As shown in FIG. 1A, the base structure 20 is attached to the edge portion 24a of the edge 24 formed around the perimeter 26 of the opening 16. FIGS. 1A and 1G show the spherical mechanism pivot point 32 of the spherical mechanism structure 30 positioned in the same geometric plane 28 (see FIG. 1A) as the opening 16. The spherical mechanism pivot point 32 and the points in the geometric plane 28 of the opening 16 are coplanar points.

FIGS. 1A-1G further show the fixed link 40 coupled to the first movable link 42a, which is coupled to the second movable link 42b, which is coupled to the third movable link 42c, which is coupled to the fourth movable link 42d, which is coupled to the end effector 70. FIGS. 1A and 1G show the plurality of joints 44 comprising the first joint 44a formed by the fixed link 40 and the first movable link 42a, the second joint 44b formed by the first movable link 42a and the second movable link 42b, the third joint 44c formed by the second movable link 42b and the third movable link 42c, the fourth joint 44d formed by the third movable link 42c and the fourth movable link 42d, and the fifth joint 44e formed by the fourth movable link 42d and the end effector 70.

The plurality of joint pivot points 48 (see FIGS. 1A, 1G) comprise the first joint pivot point 48a (see FIGS. 1A, 1G) formed by alignment of the second end through hole 174 (see FIG. 1H) of the fixed link 40 (see FIG. 1H) and the first end through hole 186 (see FIG. 1H) of the first movable link 42a (see FIG. 1H); the second joint pivot point 48b (see FIGS. 1A, 1G) formed by alignment of the second end through hole 192 (see FIG. 1H) of the second movable link 42b (see FIG. 1H) and the first end through hole 202 of the third movable link 42c (see FIG. 1H); the third joint pivot point 48c (see FIGS. 1A, 1G) formed by alignment of the second end through hole 208 (see FIG. 1H) and a body portion 210a (see FIGS. 1G, 1H) of the third movable link 42c; the fourth joint pivot point 48d (see FIGS. 1A, 1G) formed by alignment of the second end through hole 220 (see FIG. 1H) of the third movable link 42c and the first end through hole 230 (see FIG. 1H) of the fourth movable link 42d (see FIG. 1H); and the fifth joint pivot point 48e (see FIGS. 1A, 1G) formed by alignment of the second end 226b (see FIG. 1H) of the fourth movable link 42d (see FIG. 1H) and the end effector hole 78 (see FIG. 1H) of the end effector 70 (see FIG. 1H).

FIG. 1G further shows the plurality of actuators 50 comprising the first rotary actuator 52a coupled at the first joint 44a, the second rotary actuator 52b coupled at the second joint 44b, the third rotary actuator 52c coupled at the third joint 44c, the fourth rotary actuator 52d coupled at the fourth joint 44d, the fifth rotary actuator 52e coupled at the fifth joint 44e, and the linear actuator 54 coupled at the third joint 44c.

FIG. 1H shows the exploded view of the spherical mechanism robot assembly 10 of FIG. 1A, that is not attached to the panel 14 having the opening 16, such as the access port 18. FIG. 1H shows the first end 170a of the fixed link 40 attached to the base structure 20, and shows the second end through hole 174 at the second end 170b of the fixed link 40 aligned with the first end through hole 186 at the first end 182a of the first movable link 42a, via axis 188. FIG. 1H further shows the second end through hole 192 at the second end 182b of the first movable link 42a aligned with the first end through hole 202 at the first end 198a of the second movable link 42b, via axis 204. FIG. 1H further shows the second end through hole 208 at the second end 198b of the second movable link 42b aligned with the body portion 210a of the third movable link 42c, via axis 218. FIG. 1H further shows the second end through hole 220 at the second end 216b of the third movable link 42c aligned with the first end through hole 230 at the first end 226a of the fourth movable link 42d, via axis 232. FIG. 1H further shows the second end 226b of the fourth movable link 42d aligned with the end effector hole 78 of the end effector 70, via axis 237.

Figure 2A:
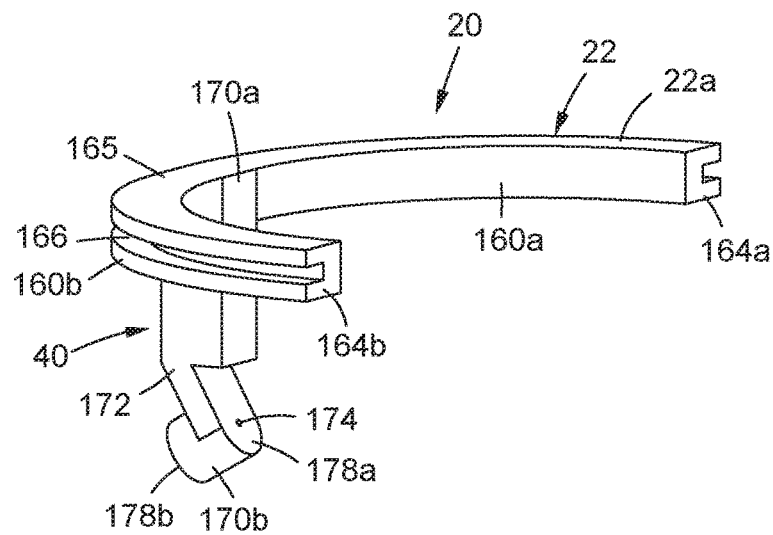
FIGS. 2A-2C are illustrations of a base structure and a fixed link that may be used in a version of a spherical mechanism robot assembly of the disclosure.
Figure 2B:
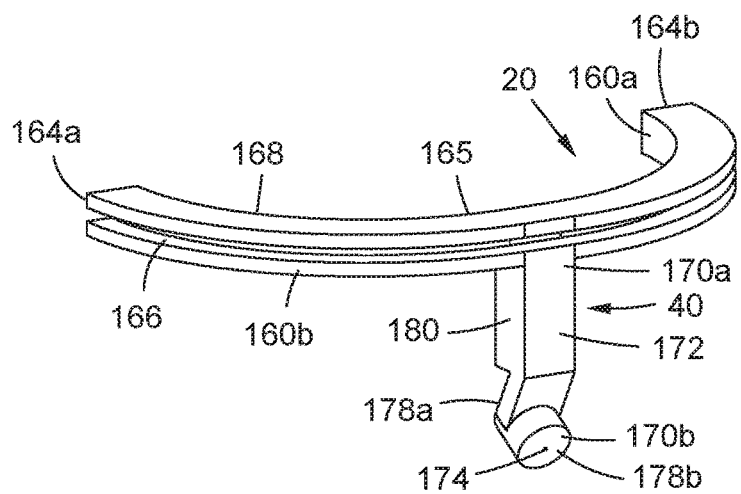
Figure 2C:
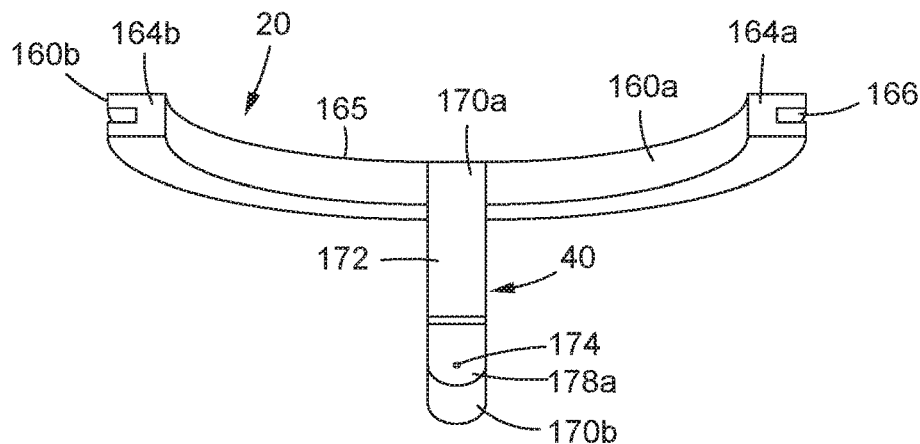

Now referring to FIGS. 2A-2C, FIGS. 2A-2C are illustrations of one version of the base structure 20 and the fixed link 40 useable in a version of the spherical mechanism robot assembly 10 of the disclosure. FIG. 2A shows a front perspective view of the base structure 20 and the fixed link 40. FIG. 2B shows a back perspective view of the base structure 20 and fixed link 40 of FIG. 2A. FIG. 2C shows a right side interior perspective view of the base structure 20 and fixed link 40 of FIG. 2A. As shown in FIG. 2A, the base structure 20 comprises the attachment device 22, such as in the form of the clamp device 22a, for attaching or clamping the base structure 20 to the edge portion 24a (see FIG. 1A) of the opening 16 (see FIG. 1A) of the panel 14 (see FIG. 1A).

As shown in FIGS. 2A-2C, the base structure 20 has an interior side 160a that faces, or is configured to face, an interior 162 (see FIG. 1A) of the opening 16 (see FIG. 1A), and has an exterior side 160b facing, and configured to be adjacent to, the edge portion 24a (see FIG. 1A) of the edge 24 (see FIG. 1A) of the opening 16 (see FIG. 1A). As shown in FIGS. 2A-2C, the base structure 20 has a first end 164a and a second end 164b. The base structure 20 may have an arc-shaped configuration 165 (see FIGS. 2A-2C) that is preferably sized or shaped to correspond to the size and shape of the edge portion 24a (see FIG. 1A) of the edge 24 (see FIG. 1A) of the opening 16 (see FIG. 1A).

As further shown in FIGS. 2A-2C, the base structure 20 may have a grooved portion 166 formed in the exterior side 160b. Preferably, the grooved portion 166 corresponds to the arc-shaped configuration 165 of the base structure 20. Preferably, the grooved portion 166 receives, or is configured to receive, the edge portion 24a (see FIG. 1A) of the edge 24 (see FIG. 1A) of the opening 16 (see FIG. 1A), and the grooved portion 166 may clamp to, or snap fit against, the edge portion 24a of the edge 24 of the opening 16. Preferably, the base structure 20 is rigid in structure and not flexible, so that the spherical mechanism robot assembly 10 is securely held or fixed to the edge portion 24a of the edge 24 of the opening 16. Preferably, the base structure 20 has a unitary structure 168 (see FIG. 2B), or a monolithic or one-piece structure or configuration. Although the base structure 20 is shown attached to the edge portion 24a in FIGS. 1A-1G, the base structure 20 may be attached to another edge portion of the edge 24 of the opening 16.

The base structure 20 is not limited to the configuration or structure shown in FIGS. 2A-2C, and the base structure 20 may have another suitable configuration or structure and may be comprised of more than one portion or part, depending on the implementation. Further, the geometric dimensions and geometric shape of each of the one or more portions or parts that form the base structure 20 may be selected based on the restrictions and constraints of the opening 16 that provides access to the interior 122 of the confined space 86 in the vehicle 80. For example, without limitation, when the confined space 86 is inside a wingbox 94 (see FIGS. 8B-8C) of the aircraft wing 92 (see FIGS. 8A, 9), the base structure 20 (see FIGS. 1A, 8C) may be shaped and sized such that the base structure 20 may be capable of easily and rigidly attaching to the access port 18 (see FIGS. 1A, 8C) that accesses the confined space 86 (see FIGS. 8A-8C).

As further shown in 2A-2C, the fixed link 40 is attached to the base structure 20. As shown in FIGS. 2A-2C, the fixed link 40 has a first end 170a, a second end 170b, and a body 172 formed between the first end 170a and the second end 170b. The first end 170a of the fixed link 40 is attached to the base structure 20, such as in the form of the attachment device 22, for example, the clamp device 22a. As further shown in FIGS. 2A-2C, the fixed link 40 extends downwardly, or away from, the base structure 20. The second end 170b of the fixed link 40 has the second end through hole 174 (see FIGS. 2A-2C) that receives, or is configured to receive, an attachment element 176 (see FIG. 1H), such as a first attachment element 176a (see FIG. 1H). The attachment element 176 may comprise a pin, a bolt, a rivet, a screw, or another suitable attachment element, to attach the fixed link 40 to the movable link 42, such as the first movable link 42a (see FIGS. 1A-1H, 3A-3C). The second end 170b of the fixed link 40 has a first side 178a (see FIGS. 2A-2C) and a second side 178b (see FIGS. 2A-2C).

Preferably, the fixed link 40 is rigid in structure and not flexible, and has a unitary structure 180 (see FIG. 2B), or a monolithic or one-piece structure or configuration. However, the structure of the fixed link 40 is not limited to the configuration or structure shown in FIGS. 2A-2C, and the fixed link 40 may have another suitable configuration or structure and may be comprised of more than one section or part, depending on the implementation. Further, in an example, the geometric dimensions and geometric shape of each of the one or more sections or parts that form the fixed link 40 are selected based on the restrictions and constraints of the base structure 20 and of the spherical mechanism structure 30 (see FIG. 1A).

Figure 3A:
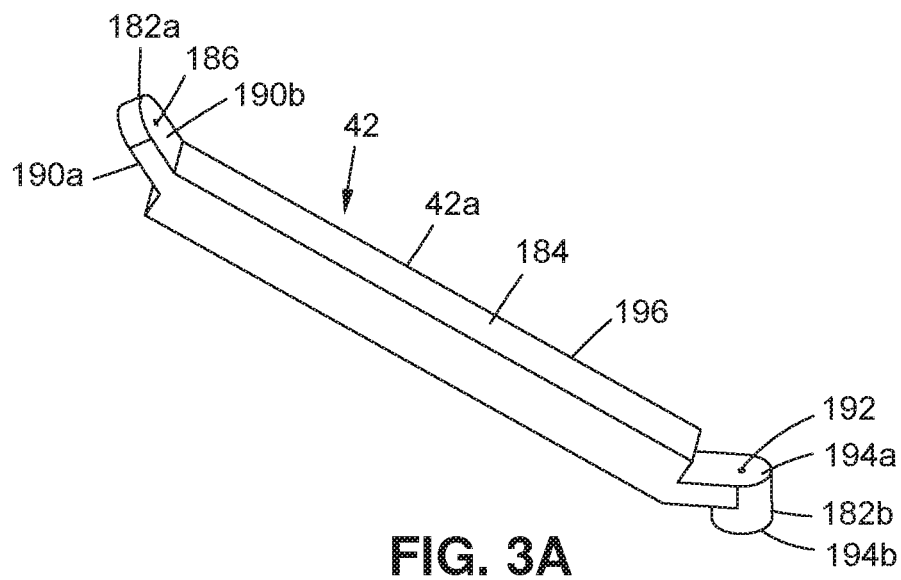
FIGS. 3A-3C are illustrations of a first movable link that may be used in a version of a spherical mechanism robot assembly of the disclosure.
Figure 3B:
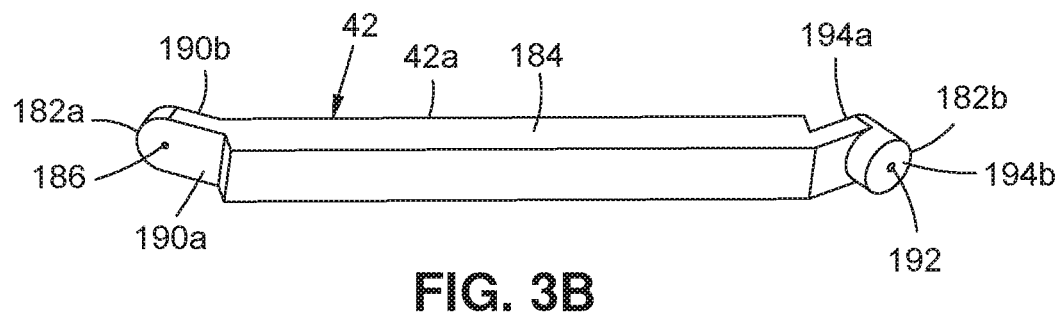
Figure 3C:
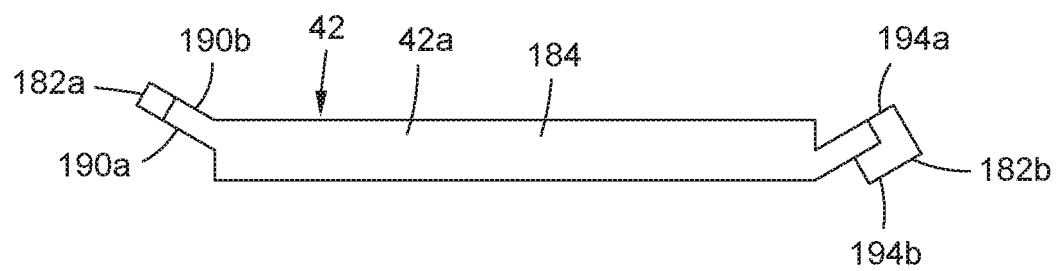

Now referring to FIGS. 3A-3C, FIGS. 3A-3C are illustrations of an example of the movable link 42 comprising the first movable link 42a useable in a version of the spherical mechanism robot assembly 10 of the disclosure. FIG. 3A shows a front perspective view of the first movable link 42a. FIG. 3B shows a back perspective view of the first movable link 42a of FIG. 3A. FIG. 3C shows a front view of the first movable link 42a of FIG. 3A. As shown in FIGS. 3A-3C, the first movable link 42a comprises a first end 182a, a second end 182b, and an elongated body 184 formed between the first end 182a and the second end 182b. As further shown in FIGS. 3A-3B, the first end 182a has the first end through hole 186 that receives, or is configured to receive, the attachment element 176 (see FIG. 1H), such as the first attachment element 176a (see FIG. 1H), to attach the first end 182a (see FIG. 1H) of the first movable link 42a (see FIG. 1H) to the second end 170b (see FIGS. 2A, 1H) of the fixed link 40 (see FIG. 1H). As shown in FIG. 1H, the first end through hole 186 in the first end 182a of the first movable link 42a aligns, or is configured to align, along axis 188, with the second end through hole 174 in the second end 170b of the fixed link 40, when the first movable link 42a is attached, or coupled to, the fixed link 40. As shown in FIGS. 3A-3C, the first end 182a of the first movable link 42a has a first side 190a and a second side 190b.

Figure 4A:
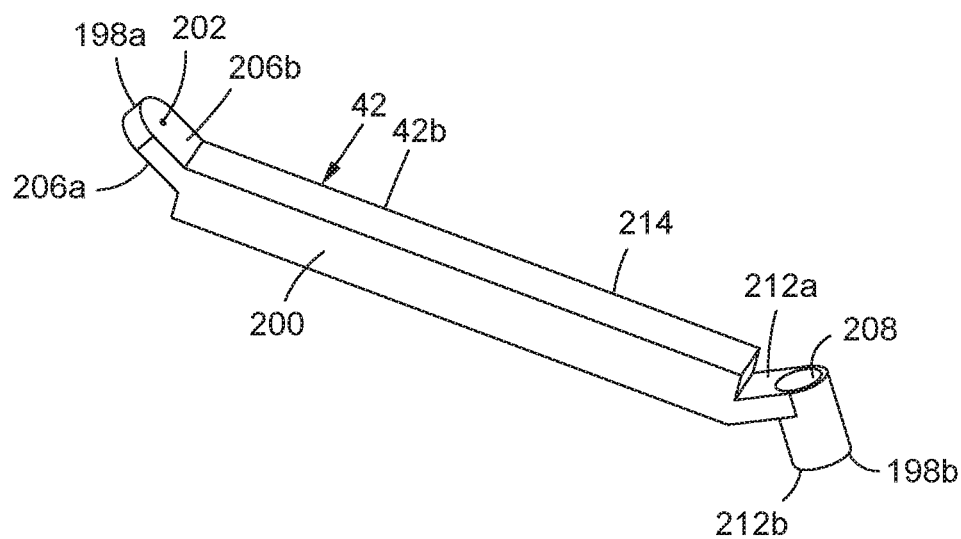
FIGS. 4A-4C are illustrations of a second movable link that may be used in a version of a spherical mechanism robot assembly of the disclosure.
Figure 4B:
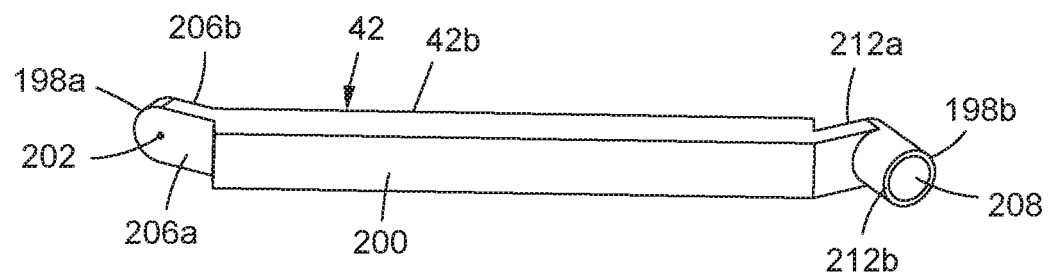
Figure 4C:
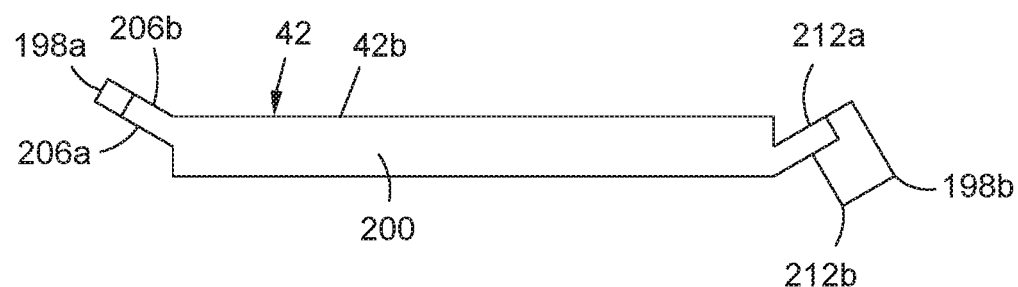

As further shown in FIGS. 3A-3B, the second end 182b of the first movable link 42a has the second end through hole 192 that receives, or is configured to receive, an attachment element 176 (see FIG. 1H), such as a second attachment element 176b (see FIG. 1H), for example, pin, a bolt, a rivet, a screw, or another suitable attachment element, to attach the second end 182b of the first movable link 42a to the second movable link 42b (see FIGS. 4A-4C). As shown in FIGS. 3A-3C, the second end 182b of the first movable link 42a has a first side 194a and a second side 194b.

Preferably, the first movable link 42a is rigid in structure and not flexible. The first movable link 42a preferably has a unitary structure 196 (see FIG. 3A), or a monolithic or one-piece structure or configuration. However, the structure of the first movable link 42a is not limited to the configuration or structure shown in FIGS. 3A-3C, and the first movable link 42a may have another suitable configuration or structure. Further, the geometric dimensions and geometric shape of the first movable link 42a may be selected based on the restrictions and constraints of the spherical mechanism structure 30 (see FIG. 1A).

Now referring to FIGS. 4A-4C, FIGS. 4A-4C are illustrations of an example of the movable link 42 comprising the second movable link 42b useable in a version of the spherical mechanism robot assembly 10 of the disclosure. FIG. 4A shows a front perspective view of the second movable link 42b. FIG. 4B shows a back perspective view of the second movable link 42b of FIG. 4A. FIG. 4C shows a front view of the second movable link 42b of FIG. 4A. As shown in FIGS. 4A-4C, the second movable link 42b comprises a first end 198a, a second end 198b, and an elongated body 200 formed between the first end 198a and the second end 198b. As further shown in FIGS. 4A-4B, the first end 198a has a first end through hole 202 that receives, or is configured to receive, the attachment element 176 (see FIG. 1H), such as the second attachment element 176b (see FIG. 1H), for example, a pin, a bolt, a rivet, a screw, or another suitable attachment element, to attach the first end 198a (see FIGS. 1H, 4A) of the second movable link 42b (see FIGS. 1H, 4A) to the second end 182b (see FIGS. 1H, 3A) of the first movable link 42a (see FIGS. 1H, 3A).

As shown in FIG. 1H, the first end through hole 202 in the first end 198a of the second movable link 42b aligns, or is configured to align, along axis 204, with the second end through hole 192 in the second end 182b of the first movable link 42a, when the second movable link 42b is attached, or coupled to, the first movable link 42a. As shown in FIGS. 4A-4C, the first end 198a of the second movable link 42b has a first side 206a and a second side 206b.

As further shown in FIGS. 4A-4B, the second end 198b of the second movable link 42b has the second end through hole 208. The second end through hole 208 receives, or is configured to receive, the body portion 210a (see FIG. 1H) of the elongated body 210 (see FIGS. 1H, 5A) of the third movable link 42c (see FIGS. 1H, 5A), to allow for linear actuation, or movement of, the third movable link 42c through the second end through hole 208, and to allow coupling of the second end 198b (see FIG. 1H) of the second movable link 42b (see FIG. 1H) to the body portion 210a of the elongated body 210 of the third movable link 42c (see FIGS. 1H, 4A-4C). As shown in FIGS. 4A-4C, the second end 198b of the second movable link 42b has a first side 212a and a second side 212b. The diameter of the second end through hole 208 is larger than the diameter of the first end through hole 202.

Preferably, the second movable link 42b is rigid in structure and not flexible. The second movable link 42b preferably has a unitary structure 214 (see FIG. 4A), or a monolithic or one-piece structure or configuration. However, the structure of the second movable link 42b is not limited to the configuration or structure shown in FIGS. 4A-4C, and the second movable link 42b may have another suitable configuration or structure. Further, the geometric dimensions and geometric shape of the second movable link 42b may be selected based on the restrictions and constraints of the spherical mechanism structure 30 (see FIG. 1A).

Figure 5A:
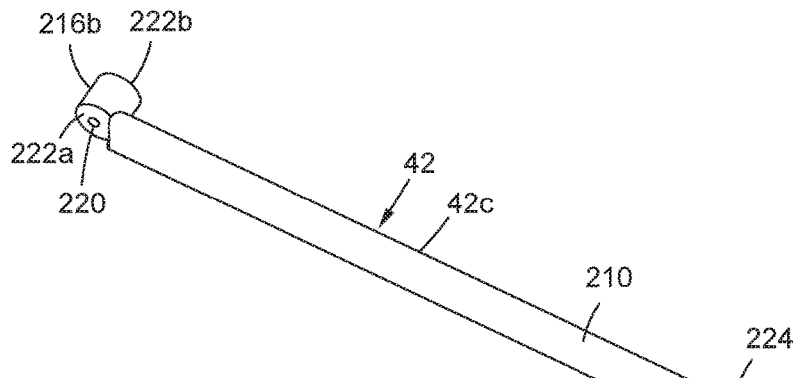
FIGS. 5A-5C are illustrations of a third movable link that may be used in a version of a spherical mechanism robot assembly of the disclosure.
Figure 5B:
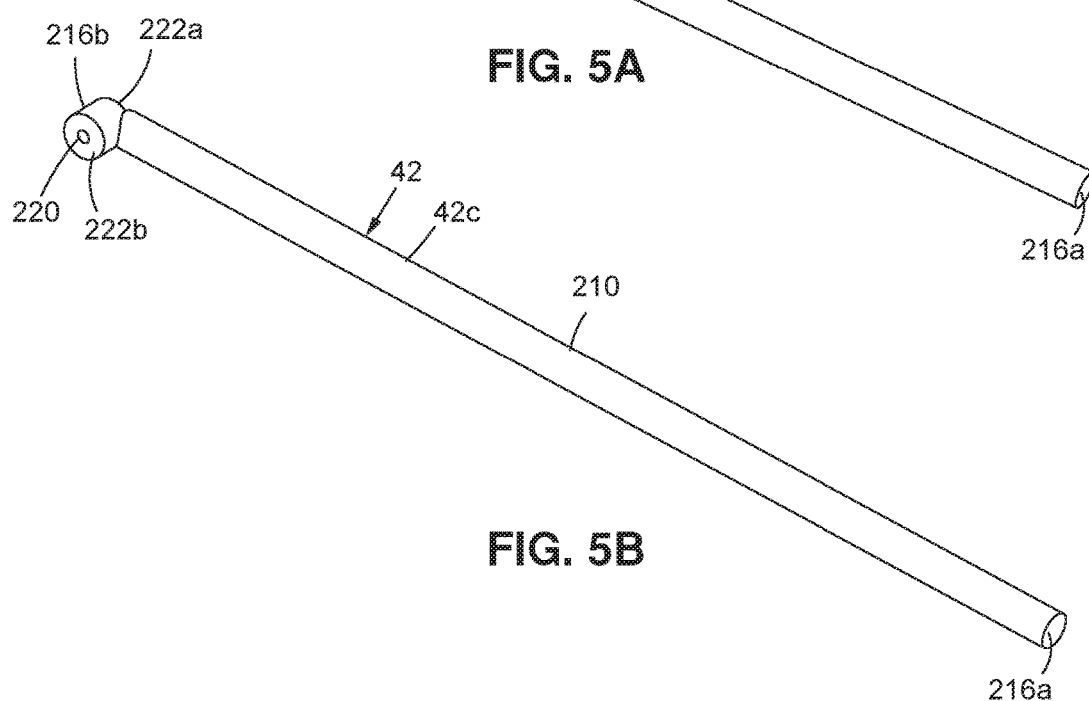
Figure 5C:
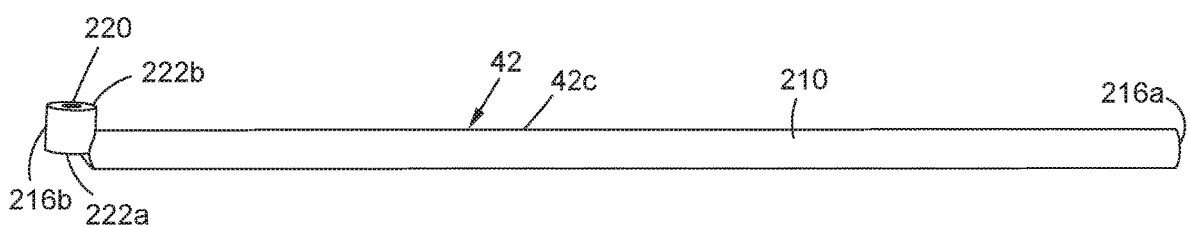

Now referring to FIGS. 5A-5C, FIGS. 5A-5C are illustrations of an example of the movable link 42 comprising the third movable link 42c useable in a version of the spherical mechanism robot assembly 10 of the disclosure. FIG. 5A shows a front perspective view of the third movable link 42c. FIG. 5B shows a back perspective view of the third movable link 42c of FIG. 5A. FIG. 5C shows a front view of the third movable link 42c of FIG. 5A. As shown in FIGS. 5A-5C, the third movable link 42c comprises a first end 216a, a second end 216b, and the elongated body 210 formed between the first end 216a and the second end 216b. As shown in FIG. 1H, the first end 216a of the third movable link 42c is inserted into, or is configured for insertion into, the second end through hole 208 of the second movable link 42b, along axis 218. The first end 216a (see FIGS. 5A-5C) of the third movable link 42c (see FIGS. 5A-5C) and the body 210 (see FIGS. 5A-5C) of the third movable link 42c have a diameter that is slightly less than the diameter of the second end through hole 208 (see FIGS. 4A-4C) of the second movable link 42b (see FIGS. 4A-4C), to allow for actuation and movement of the first end 216a, and the body 210 (see FIG. 1H), such as one or more body portions 210a (see FIG. 1H), of the third movable link 42c to slide through the second end through hole 208 of the second movable link 42b.

Figure 6A:
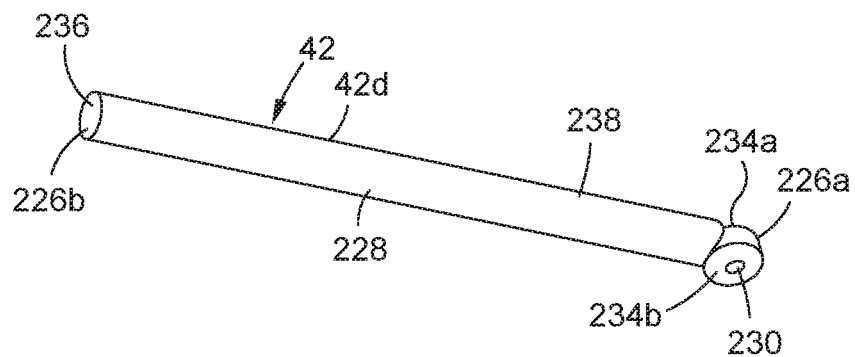
FIGS. 6A-6C are illustrations of a fourth movable link that may be used in a version of a spherical mechanism robot assembly of the disclosure.
Figure 6B:
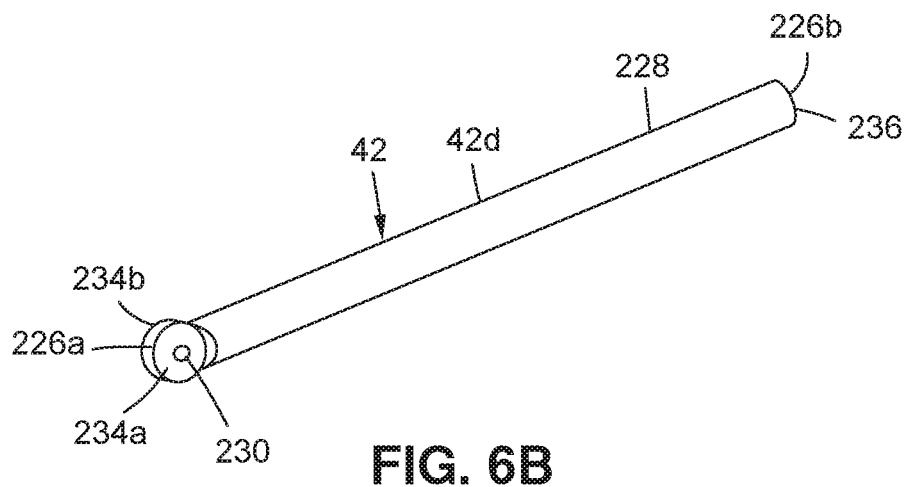
Figure 6C:
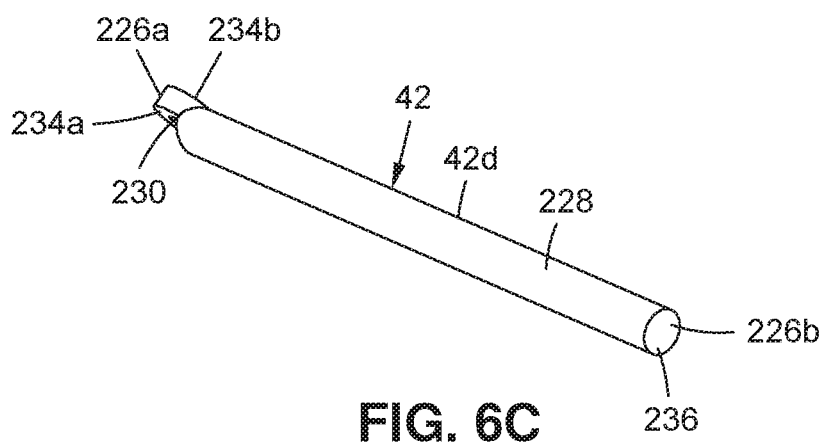

As further shown in FIGS. 5A-5C, the second end 216b of the third movable link 42c has the second end through hole 220 that receives, or is configured to receive, an attachment element 176 (see FIG. 1H), such as a third attachment element 176c (see FIG. 1H), for example, a pin, a bolt, a rivet, a screw, or another suitable attachment element, to attach the second end 216b of the third movable link 42c to the fourth movable link 42d (see FIGS. 6A-6C). As shown in FIGS. 5A-5C, the second end 216b of the third movable link 42c has a first side 222a and a second side 222b.

Preferably, the third movable link 42c is rigid in structure and not flexible. The third movable link 42c preferably has a unitary structure 224 (see FIG. 5A), or a monolithic or one-piece structure or configuration. However, the structure of the third movable link 42c is not limited to the configuration or structure shown in FIGS. 5A-5C, and the third movable link 42c may have another suitable configuration or structure. Further, the geometric dimensions and geometric shape of the third movable link 42c may be selected based on the restrictions and constraints of the spherical mechanism structure 30 (see FIG. 1A).

Now referring to FIGS. 6A-6C, FIGS. 6A-6C are illustrations of an example of the movable link 42, such as the fourth movable link 42d, useable in a version of the spherical mechanism robot assembly 10 of the disclosure. FIG. 6A shows a front perspective view of the fourth movable link 42d. FIG. 6B shows a back perspective view of the fourth movable link 42d of FIG. 6A. FIG. 6C shows a front view of the fourth movable link 42d of FIG. 6A. As shown in FIGS. 6A-6C, the fourth movable link 42d comprises a first end 226a, a second end 226b, and an elongated body 228 formed between the first end 226a and the second end 226b. As further shown in FIGS. 6A-6C, the first end 226a has the first end through hole 230 that receives, or is configured to receive, the attachment element 176 (see FIG. 1H), such as the third attachment element 176c (see FIG. 1H), for example, a pin, a bolt, a rivet, a screw, or another suitable attachment element, to attach the first end 226a of the fourth movable link 42d to the second end 216b of the third movable link 42c (see FIGS. 5A-5C).

As shown in FIG. 1H, the first end through hole 230 in the first end 226a of the fourth movable link 42d aligns, or is configured to align, along axis 232, with the second end through hole 220 in the second end 216b of the third movable link 42c, when the fourth movable link 42d is attached, or coupled to, the third movable link 42c. As shown in FIGS. 6A-6C, the first end 226a of the fourth movable link 42d has a first side 234a and a second side 234b.

As shown in FIGS. 6A and 6C, the second end 226b of the fourth movable link 42d has a flat end face 236. The second end 226b of the fourth movable link 42d is inserted into, or is configured for insertion into, the end effector hole 78 (see FIG. 7A) of the end effector 70 (see FIG. 7A). As shown in FIG. 1H, the second end 226b of the fourth movable link 42d aligns, or is configured to align, along axis 237, with the end effector hole 78 of the end effector 70, when the fourth movable link 42d is attached, or coupled to, the end effector 70.

The second end 226b of the fourth movable link 42d and the elongated body 228 of the fourth movable link 42d have a diameter that is slightly less than the diameter of the end effector hole 78, to allow for fitted insertion of the second end 226b of the fourth movable link 42d into the end effector hole 78, and to allow for rotation actuator of the end effector 70. As shown in FIGS. 6A-6C, the first end 226a of the fourth movable link 42d has a first side 234a and a second side 234b.

Preferably, the fourth movable link 42d is rigid in structure and not flexible. The fourth movable link 42d preferably has a unitary structure 238 (see FIG. 6A), or a monolithic or one-piece structure or configuration. However, the structure of the fourth movable link 42d is not limited to the configuration or structure shown in FIGS. 6A-6C, and the fourth movable link 42d may have another suitable configuration or structure. Further, the geometric dimensions and geometric shape of the fourth movable link 42d may be selected based on the restrictions and constraints of the spherical mechanism structure 30 (see FIG. 1A).

Figure 7B:
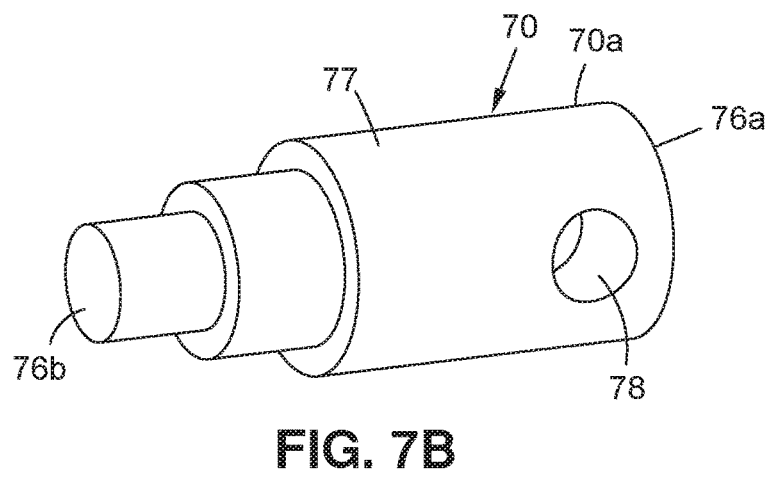
Figure 7C:
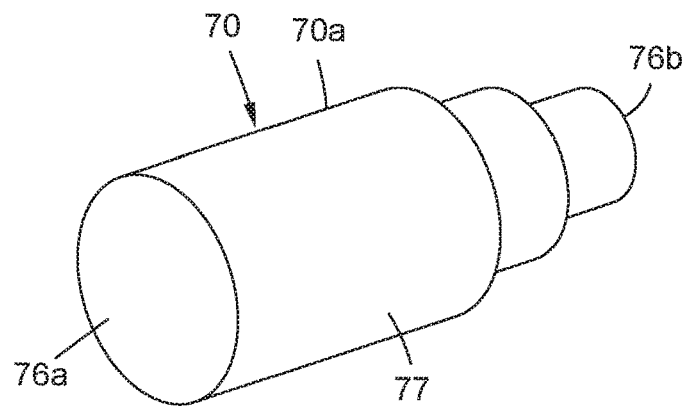

Now referring to FIGS. 7A-7C, FIGS. 7A-7C are illustrations of the end effector 70, such as the interchangeable end effector 70a, useable in a version of the spherical mechanism robot assembly 10 of the disclosure. FIG. 7A shows a front perspective view of the end effector 70. FIG. 7B shows a front view of the end effector 70 of FIG. 7A. FIG. 7C shows a back perspective view of the end effector 70 of FIG. 7A. As shown in FIGS. 7A-7C, the end effector 70 comprises the first end 76a, the second end 76b, and the body 77 formed between the first end 76a and the second end 76b. As shown in FIGS. 7A-7B, the end effector 70 has the end effector hole 78. The end effector hole 78 (see FIGS. 7A, 1H) receives, or is configured to receive, the second end 226b (see FIGS. 6A, 1H) of the fourth movable link 42d (see FIG. 1H).

Now referring to FIG. 8A, FIG. 8A is an illustration of a bottom perspective view of a version of the spherical mechanism robot system 12 coupled to a vehicle 80, such as the air vehicle 82, for example, an aircraft 82a. In another version of the disclosure, there is provided the spherical mechanism robot system 12 (see FIG. 8A) that includes the spherical mechanism robot assembly 10 (see FIG. 8A). Preferably, the spherical mechanism robot system 12 is an automated system 13 (see FIG. 8A). As shown in FIG. 8A, the spherical mechanism robot system 12 that includes the spherical mechanism robot assembly 10 is for use in a vehicle 80, such as an air vehicle 82, for example an aircraft 82a, or another type of vehicle 80.

As shown in FIG. 8A, the air vehicle 82 comprises an aircraft 82a. The air vehicle 82 may also comprise a rotorcraft, a spacecraft, or another type of air vehicle 82. The vehicle 80 may further comprise another suitable vehicle, such as a watercraft, an automobile, or another type of vehicle 80. The vehicle 80 (see FIGS. 8A, 9), such as the aircraft 82a (see FIGS. 8A, 9), has one or more structures 84 (see FIGS. 8A, 9), such as one or more aircraft structures 84a (see FIGS. 8A, 9). Each structure 84 has one or more confined spaces 86 (see FIGS. 8A-8C, 9), such as one or more aircraft confined spaces 86a (see FIGS. 8A-8C) that require one or more confined space operations 88 (see FIG. 10) to be performed in the one or more confined spaces 86. Preferably, the one or more confined space operations 88 are one or more aircraft assembly operations 90 (see FIG. 10).

Figure 9:
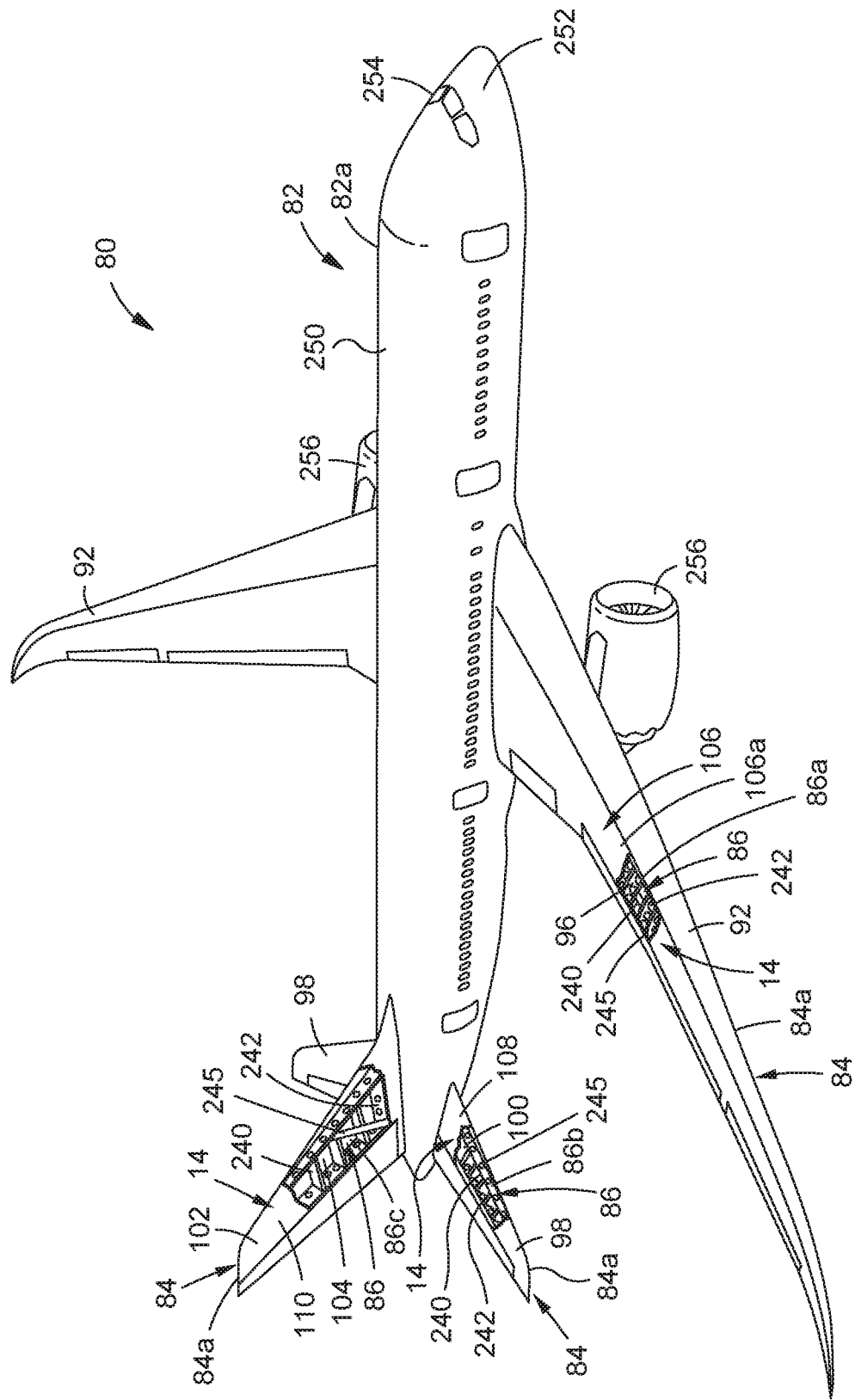
FIG. 9 is an illustration of a perspective view of an aircraft with cutaway portions of an aircraft wing, a horizontal stabilizer, and a vertical stabilizer.

When the vehicle 80 comprises an air vehicle 82, such as an aircraft 82a, the one or more structures 84, as shown in FIGS. 8A and 9, may comprise one or more aircraft structures 84a. The aircraft structure 84a may comprise an aircraft wing 92 (see FIGS. 8A, 9) having a wingbox 94 (see FIGS. 8B-8C) and/or a rib bay 96 (see FIGS. 8B, 9). As shown in FIG. 9, the aircraft structure 84a may comprise a horizontal stabilizer 98 having a horizontal stabilizer rib bay 100. As further shown in FIG. 9, the aircraft structure 84a may comprise a vertical stabilizer 102 having a vertical stabilizer rib bay 104. The aircraft structure 84a may comprise another type of aircraft structure 84a having one or more confined spaces 86. The structure 84, such as the aircraft structure 84a, may have one or more panels 14 (see FIGS. 8A-8C). The one or more panels 14 may comprise a wing skin panel 106 (see FIGS. 8A-8C, 9), such as an upper wing skin panel 106a (see FIGS. 8B-8C, 9) and a lower wing skin panel 106b (see FIGS. 8A-8C), of the aircraft wing 92. As further shown in FIG. 9, the panel 14 may comprise a horizontal stabilizer panel 108 of the horizontal stabilizer 98, a vertical stabilizer panel 110 of the vertical stabilizer 102, or another type of panel 14.

As shown in FIG. 8A, the base structure 20 of the spherical mechanism robot assembly 10 is attached to the opening 16, such as the access port 18, for example, an underwing access port 18a, of the aircraft wing 92, of the vehicle 80, such as the air vehicle 82, for example, the aircraft 82a. The location of the attachment of the base structure 20 on the opening 16, such as the access port 18, is not limited to that shown in FIG. 8A, and the base structure 20 may be attached to other locations along the edge 24 (see FIG. 8A) of the perimeter 26 (see FIG. 8A) of the opening 16. In an example, the base structure 20 is in the form of an attachment device 22 (see FIG. 2A), such as a clamp device 22a (see FIG. 2A), or another suitable form. The base structure 20, for example, the clamp device 22a, enables secure attachment to the opening 16 of the vehicle 80, and enables accurate positioning of the spherical mechanism robot assembly 10 relative to the confined space 86 in the vehicle 80, to take advantage of the system kinematics of the spherical mechanism robot assembly 10.

As shown in FIG. 8A, the panel 14 has the opening 16, such as the access port 18, for example, the underwing access port 18a, formed through the panel 14, such as the lower wing skin panel 106b, of the structure 84, such as the aircraft structure 84a, to provide the spherical mechanism robot assembly 10 with access to the confined space 86, such as the aircraft wing confined space 86a. The opening 16 preferably comprises the through opening 16a (see FIG. 8A), or through hole, in the form of the access port 18 (see FIG. 8A), formed in and through the panel 14.

The opening 16, in the form of the access port 18, preferably has a cover 112 (see FIG. 8B), that may be removed or opened, to provide the spherical mechanism robot assembly 10 with access to the confined space 86 in the structure 84 of the vehicle 80. The opening 16, such as the access port 18, preferably has a shape 114 (see FIG. 1A) and a size 116 (see FIG. 1A) that is sufficient to allow a portion 10a (see FIGS. 1A, 8C) of the spherical mechanism robot assembly 10 to access the confined space 86 (see FIGS. 8A-8C) in the structure 84 (see FIGS. 8A, 8C) of the vehicle 80. The opening 16, such as the access port 18, may have a shape 114 comprising an oval shape 114a (see FIG. 1A). However, the opening 16, such as the access port 18, may have another suitable shape 114. As shown in FIG. 8A, the opening 16, such as the access port 18, has the edge 24 formed along the perimeter 26 of the opening 16, such as the access port 18. The opening 16, such as the access port 18, lies in the geometric plane 28 (see FIG. 1A).

When the vehicle 80 is an air vehicle 82, such as an aircraft 82a, the opening 16, such as the access port 18, may be formed in and through the wing skin panel 106 (see FIGS. 8A-8C, 9), such as the lower wing skin panel 106b (see FIGS. 8A-8C), and the confined space 86 of the aircraft 82a may comprise the aircraft wing confined space 86a (see FIGS. 8A, 9), such as inside the aircraft wing 92 (see FIGS. 8A, 9), for example, the wingbox 94 (see FIGS. 8B-8C) and/or the rib bay 96 (see FIGS. 8B, 9) of the aircraft wing 92. In addition, when the vehicle 80 is an air vehicle 82, such as an aircraft 82a, the opening 16, such as the access port 18, may be formed in and through the horizontal stabilizer panel 108 (see FIG. 9), and the confined space 86 of the aircraft 82a may comprise a horizontal stabilizer confined space 86b (see FIG. 9), such as inside the horizontal stabilizer 98 (see FIG. 9), for example, the horizontal stabilizer rib bay 100 (see FIG. 9). In addition, when the vehicle 80 is an air vehicle 82, such as an aircraft 82a, the opening 16, such as the access port 18, may be formed in and through the vertical stabilizer panel 110 (see FIG. 9), and the confined space 86 of the aircraft 82a may comprise a vertical stabilizer confined space 86c (see FIG. 9), such as inside the vertical stabilizer 102 (see FIG. 9), for example, the vertical stabilizer rib bay 104 (see FIG. 9).

As shown in FIG. 8A, the spherical mechanism robot system 12 further comprises the spherical mechanism robot assembly 10, discussed in detail above with respect to FIGS. 1A-1H. The spherical mechanism robot system 12 enables the spherical mechanism robot assembly 10 to access the interior 122 (see FIGS. 8A-8C) of the confined space 86 in the structure 84, such as the aircraft structure 84a, of the vehicle 80, such as the aircraft 82a. The spherical mechanism robot assembly 10 is configured such that a majority portion 136 (see FIG. 8C) of the spherical mechanism robot assembly 10 (see FIG. 8C), such as 60% to 90%, of the spherical mechanism robot assembly 10, remains outside of the confined space 86 (see FIGS. 8A-8C), while a remaining portion 138 (see FIG. 8C) of the spherical mechanism robot assembly 10, such as 10% to 40%, of the spherical mechanism robot assembly 10, accesses and occupies the confined space 86 in the structure 84 (see FIG. 8C), such as the aircraft structure 84a (see FIG. 8C), of the vehicle 80 (see FIG. 8A), such as the aircraft 82a (see FIG. 8A), to perform the confined space operations 88 (see FIG. 10) in the structure 84, such as the aircraft structure 84a, of the vehicle 80, such as the aircraft 82a.

FIG. 8A shows the first movable link 42a, the second movable link 42b, the third movable link 42c, and the fourth movable link 42d, of the spherical mechanism robot assembly 10. FIG. 8A further shows the interior 122 of the confined space 86, such as in the form of the aircraft wing confined space 86a.

As further shown in FIG. 8A, the spherical mechanism robot assembly 10 is attached or coupled to a control and power system 140, via one or more connection elements 142, such as a control tether 144, or another suitable connection element 142. The one or more connection elements 142 may comprise cables, wired connection elements, wireless connection elements, or other suitable connection elements 142, to connect the spherical mechanism robot assembly 10 to the control and power system 140. As shown in FIG. 8A, the connection element 142 has a first end 143a attached to the control and power system 140, and has a second end 143b attached to the base structure 20 of the spherical mechanism robot assembly 10. However, the second end 143b may be attached to another portion of the spherical mechanism robot assembly 10. The control and power system 140 may be on the ground or at a location remote from the spherical mechanism robot assembly 10.

As shown in FIG. 8A, the control and power system 140 comprises a controller 146 that controls, or is configured to control, such as remotely control, movement and positioning of the spherical mechanism robot assembly 10. The controller 146 is preferably a remote controller 146a (see FIG. 8A), such as in the form of a programmable logic controller (PLC) 146b (see FIG. 8A), or another similar type of controller 146. The programmable logic controller (PLC) 146b may take the form of, for example, without limitation, a programmable logic array, a programmable array logic, a field programmable logic array, a field programmable gate array, or some other type of programmable hardware device.

As further shown in FIG. 8A, the control and power system 140 preferably comprises one or more computers 148, one or more processors 150, one or more storage devices 152, and one or more software programs 154. The one or more computers 148 preferably include one or more processors 150, and may further include an operating system. Each computer 148 controls, or is configured to control, one or more functions through one or more software programs 154, stored on one or more storage devices 152, such as computer memory and persistent storage. The computer memory may comprise one or more of a random access memory (RAM), including dynamic and/or static RAM, on-chip or off-chip cache memory, or other suitable computer memory. The persistent storage may comprise one or more of a flash memory, a hard drive, Read-Only Memory (ROM), magnetic storage devices such as hard disks, floppy disk drives, and rewritable magnetic tape, rewritable optical disk drives and/or media, non-volatile random access memory (NVRAM), or other suitable persistent storage. In addition, each computer 148 may have one or more input/output units that provide for the input and output of commands, such as a keyboard, a mouse, a joystick, or other input/output devices. The one or more software programs 154 may comprise a system logic, an algorithm, a set of instructions, or another suitable software program.

System kinematics of the spherical mechanism robot assembly 10 and the geometry 66 (see FIG. 8C) of the structure 84 (see FIGS. 8A, 8C), such as the aircraft structure 84a (see FIGS. 8A, 8C), for example, the aircraft wing 92 (see FIGS. 8A, 9), are preferably input into the controller 146 (see FIG. 8A), such as the programmable logic controller (PLC) 146b (see FIG. 8A). The controller 146, such as the programmable logic controller (PLC) 146b, controls the movement and position of the portion 10a or components of the spherical mechanism robot assembly 10 to the desired location in the confined space 86 of the structure 84, such as the aircraft structure 84a. The programmable logic controller (PLC) 146b may be configured to perform certain operations, and may be permanently configured to perform these operations or may be reconfigurable.

As shown in FIG. 8A, the control and power system 140 further comprises one or more power supplies 156, to provide power to move and position the spherical mechanism robot assembly 10 in a plurality of positions 158 (see FIG. 8C) inside the confined space 86 (see FIG. 8C) of the structure 84 (see FIG. 8C) of the vehicle 80. The one or more power supplies 156 may comprise batteries, electricity, or other power supply elements.

Now referring to FIG. 8B, FIG. 8B is an illustration of a side perspective view of a wingbox 94 of an aircraft wing 92 (see FIG. 8A) of an aircraft 82a (see FIG. 8A), such as the aircraft wing 92 of FIG. 8A. As shown in FIG. 8B, the opening 16, such as the access port 18, for example, the underwing access port 18a, has the cover 112, and the cover 112 may be removed or opened to open the access port 18, so that the spherical mechanism robot assembly 10 may partially access the interior 122 of the confined space 86 in the rib bay 96 of the wingbox 94.

As shown in FIG. 8B, the wingbox 94 includes panels 14, such as in the form of wing skin panels 106, including the upper wing skin panel 106a and the lower wing skin panel 106b. As further shown in FIG. 8B, the lower wing skin panel 106b has the opening 16, such as the access port 18, for example, the underwing access port 18a, formed in the lower wing skin panel 106b.

As shown in FIG. 8B, the wingbox 94 further includes a plurality of stringers 240, extending in the interior 122 across the upper wing skin panel 106a and across the lower wing skin panel 106b. As shown in FIG. 8B, the wingbox 94 further includes a rib 242 with multiple rib openings 244, where each rib opening 244 receives, or is configured to receive a portion of a stringer 240. As shown in FIG. 8B, the wingbox 94 further includes a front spar 246, a rear spar 248, and a plurality of fastener elements 126 installed in the wingbox 94, for example, to secure the upper wing skin panel 106a and the lower wing skin panel 106b to the front spar 246 and the rear spar 248, respectively, and to secure the rib 242 to the lower wing skin panel 106b and to the upper wing skin panel 106a.

Now referring to FIG. 8C, FIG. 8C is an illustration of a cross-sectional view of a wingbox 94, such as the wingbox 94 of FIG. 8B, showing a version of the spherical mechanism robot assembly 10 coupled to the opening 16, such as the access port 18, for example, the underwing access port 18a, of the panel 14 of the wingbox 94.

As shown in FIG. 8C, the structure 84, such as the aircraft structure 84a, has an interior 118 and an exterior 120. The interior 118 may have one or more sections 118a (see FIG. 8C) within the confined space 86. As further shown in FIG. 8C, the confined space 86 has an interior 122 and an exterior 124. The interior 122 has one or more portions 122a (see FIG. 8C) in which the one or more confined space operations 88 (see FIG. 10) are performed. The spherical mechanism robot assembly 10 accesses, or is configured to access, the interior 118 of the structure 84 of the vehicle 80, such as the interior 122 of the confined space 86 in the vehicle 80, to perform, or is configured to perform, one or more confined space operations 88 (see FIG. 10) in the vehicle 80.

FIG. 8C shows the structure 84, such as the aircraft structure 84a, in the form of wingbox 94, having the panels 14, such as in the form of wing skin panels 106, including the upper wing skin panel 106a and the lower wing skin panel 106b, attached to the front spar 246 and the rear spar 248. FIG. 8C shows the wingbox 94 having the plurality of stringers 240 attached to the upper wing skin panel 106a and to the lower wing skin panel 106b.

As shown in FIG. 8C, the base structure 20 of the spherical mechanism robot assembly 10 is attached to the edge 24 (see FIG. 8A) of the opening 16, such as the access port 18, for example, the underwing access port 18a, of the wingbox 94, which is part of the aircraft wing 92 (see FIG. 8A), of the vehicle 80 (see FIG. 8A), such as the aircraft 82a (see FIG. 8A). As further shown in FIG. 8C, the base structure 20 is coupled to the first end 34a of the spherical mechanism structure 30 comprising the first movable link 42a, the second movable link 42b, the third movable link 42c, and the fourth movable link 42d. The second end 34b (see FIG. 8C) of the spherical mechanism structure 30 and the fourth movable link 42d are coupled to the end effector 70 (see FIG. 8C). The end effector 70 is preferably an interchangeable end effector 70a (see FIG. 1A) equipped with one or more tools 72 (see FIG. 8C) for performing installation, drilling, removing, or countersinking of the fastener elements 126 (see FIG. 8B), or for sealing, painting, inspecting, recording, or another suitable operation.

As shown in FIG. 8C, in an example, the tool 72 is be coupled to or attached to the end effector 70. A number of different tools 72 may be used to perform the confined space operations 88 (see FIG. 10). The tools 72 may include, for example, without limitation, at least one of, an installing tool or a fastening tool to install or fasten the fastener element 126 (see FIGS. 8B, 10), a drilling tool for drilling the fastener element 126, a removing tool for removing the fastener element 126, a sealing tool, such as a sealant application device, for applying the sealant 128 (see FIG. 10) around the fastener element 126, a painting tool for applying paint 130 (see FIG. 10) to one or more portions 122a (see FIG. 8C) of the interior 122 (see FIG. 8C) of the confined space 86 (see FIG. 8C), an inspection tool for inspecting one or more portions 122a of the interior 122 of the confined space 86, an imaging tool, such as a camera 134 (see FIG. 10), or a laser scanner, for taking images 132 (see FIG. 10) of one or more portions 122a of the interior 122 of the confined space 86, a lighting tool or device, a measurement tool, or some other suitable type of tool 72. The end effector 70 and the tool 72 may be powered with one or more power supplies 156 (see FIG. 8A) of the control and power system 140 (see FIG. 8A), for example, electric power. The tool 72 may be changed or modified depending on the type of confined space operations 88 performed, or to be performed, by the spherical mechanism robot assembly 10 and the end effector 70 of the spherical mechanism robot assembly 10.

FIG. 8C further shows the plurality of joints 44, including the first joint 44a, the second joint 44b, the third joint 44c, the fourth joint 44d, and the fifth joint 44e. As shown in FIG. 8C, only a portion 10a of the spherical mechanism robot assembly 10, including the end effector 70, the fourth movable link 42d, and a portion of the third movable link 42c, is inserted into the interior 122 of the confined space 86, such as in the form of the aircraft wing confined space 86a, to perform the one or more confined space operations 88 (see FIG. 10).

As shown in FIG. 8C, the base structure 20, the fixed link 40, the first movable link 42a, the second movable link 42b, and at least a ⅔ (two-thirds) portion 43 of the third movable link 42c are positioned outside of the interior 122 of the confined space 86, and during performance of the confined space operations 88 (see FIG. 10) in the interior 122 of the confined space 86 in the vehicle 80 (see FIG. 8A). The portion 10a (see FIG. 8C) of the spherical mechanism robot assembly 10 (see FIG. 8C) is designed to be easily positioned within the interior 122 (see FIG. 8C) of the confined space 86 (see FIG. 8C) to perform, or facilitate the performance of, the one or more confined space operations 88 (see FIG. 10).

The plurality of movable links 42 (see FIG. 8C), the plurality of joints 44 (see FIG. 8C), and the plurality of actuators 50 (see FIG. 1G) have sufficient movement capability and ability to reach numerous areas within the confined space 86 (see FIG. 8C) in the structure 84 (see FIG. 8C), such as the aircraft structure 84a (see FIG. 8C), for example, the wingbox 94 (see FIG. 8C). The operation and positioning of the spherical mechanism robot assembly 10 is controlled and powered with the control and power system 140 (see FIG. 8A).

The spherical mechanism robot system 12 (see FIG. 8A) enables the spherical mechanism robot assembly 10 (see FIGS. 8A, 8C) to access the interior 122 (see FIGS. 8A-8C) of the confined space 86 (see FIGS. 8A-8C) in the aircraft structure 84a (see FIG. 8C) of the aircraft 82a (see FIG. 8A). The spherical mechanism robot assembly 10 is configured such that a a majority portion 136 (see FIG. 8C) of the spherical mechanism robot assembly 10 (see FIG. 8C), such as 60% to 90%, of the spherical mechanism robot assembly 10, remains outside of the confined space 86 (see FIGS. 8A-8C), while a remaining portion 138 (see FIG. 8C) of the spherical mechanism robot assembly 10, such as 10% to 40%, of the spherical mechanism robot assembly 10, accesses and occupies the confined space 86 in the aircraft structure 84a (see FIG. 8C) of the aircraft 82a (see FIG. 8A), to perform, or to be configured to perform, the one or more confined space operations 88 (see FIG. 10) in the aircraft structure 84a (see FIG. 8C) of the aircraft 82a.

Figure 10:
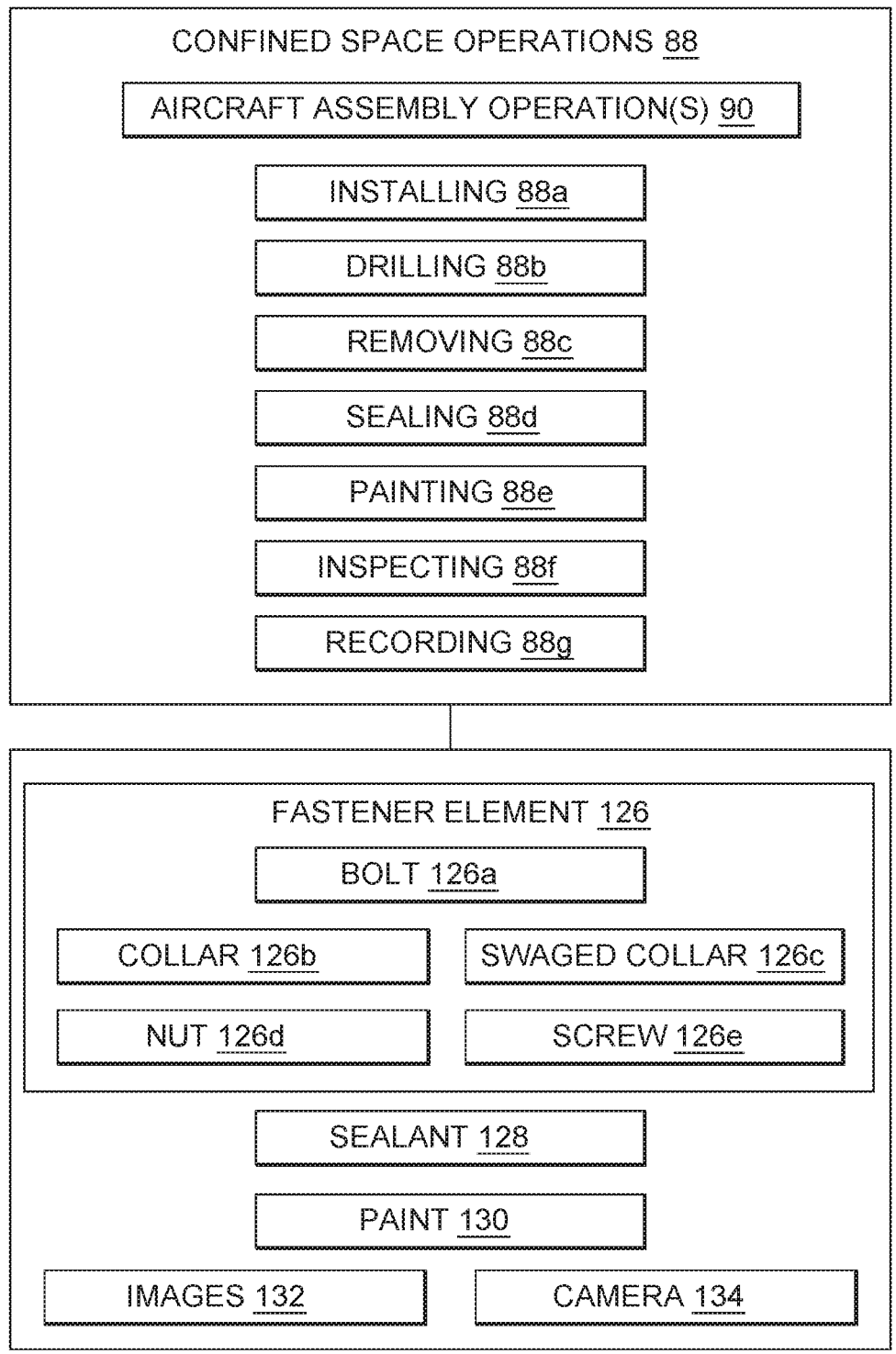
FIG. 10 is an illustration of a block diagram showing confined space operations that may be performed with a version of a spherical mechanism robot assembly of a spherical mechanism robot system of the disclosure.

Now referring to FIG. 9, FIG. 9 is an illustration of a perspective view of a vehicle 80, such as an air vehicle 82, for example, an aircraft 82a, with cutaway portions of the aircraft wing 92, the horizontal stabilizer 98, and the vertical stabilizer 102, to show confined spaces 86, for which a version of the spherical mechanism robot system 12 (see FIG. 8A), with the spherical mechanism robot assembly 10, may be used in, to perform, or to be configured to perform, the one or more confined space operations 88 (see FIG. 10).

As shown in FIG. 9, the vehicle 80, such as the air vehicle 82, for example, the aircraft 82a, comprises a fuselage 250, a nose 252, a cockpit 254, engines 256, aircraft wings 92, horizontal stabilizers 98, and a vertical stabilizer 102. As further shown in FIG. 9, one aircraft wing 92 has a cutaway portion of a panel 14, such as the wing skin panel 106, for example, the upper wing skin panel 106a, to show the confined space 86, such as the aircraft wing confined space 86a, for example, in the rib bay 96, in which the spherical mechanism robot assembly 10 (see FIGS. 1A-1H) may be used to perform, or configured to perform, the one or more confined space operations 88 (see FIG. 10). As shown in FIG. 9, the cutaway portion of the wing skin panel 106 further shows stringers 240, ribs 242, and spars 245.

As further shown in FIG. 9, one horizontal stabilizer 98 has a cutaway portion of a panel 14, such as a horizontal stabilizer panel 108, to show a confined space 86, such as a horizontal stabilizer confined space 86b, for example, a horizontal stabilizer rib bay 100, in which the spherical mechanism robot assembly 10 (see FIGS. 1A-1H) may be used to perform, or configured to perform, the one or more confined space operations 88 (see FIG. 10). The cutaway portion of the horizontal stabilizer panel 108 further shows stringers 240, ribs 242, and spars 245.

As further shown in FIG. 9, the vertical stabilizer 102 has a cutaway portion of a panel 14, such as a vertical stabilizer panel 110, to show a confined space 86, such as a vertical stabilizer confined space 86c, for example, a vertical stabilizer rib bay 104, in which the spherical mechanism robot assembly 10 (see FIGS. 1A-1H) may be used to perform, or configured to perform, the one or more confined space operations 88 (see FIG. 10). The cutaway portion of the vertical stabilizer panel 110 further shows stringers 240, ribs 242, and spars 245.

It is noted that the confined spaces 86 in the aircraft wing 92, the horizontal stabilizer 98, and the vertical stabilizer 102, as shown in FIG. 9, are examples, and other confined spaces 86, where openings 16 (see FIGS. 1A, 8A-8C), such as access ports 18 (see FIGS. 1A, 8A-8C), are used to access the interiors 122 (see FIGS. 8A-8C) of the confined spaces 86, may also be accessed with the spherical mechanism robot assembly 10 (see FIGS. 1A-1H) of the spherical mechanism robot system 12 (see FIG. 8A), of the disclosure.

Now referring to FIG. 10, FIG. 10 is an illustration of a block diagram showing confined space operations 88 that may be performed with a version of the spherical mechanism robot assembly 10 (see FIGS. 1A-1H, 8A, 8C) of the spherical mechanism robot system 12 (see FIG. 8A) of the disclosure. The one or more confined space operations 88 (see FIG. 10) preferably are performed or conducted in the interior 122 (see FIGS. 8A-8C) of the one or more confined spaces 86 (see FIGS. 8A-8C) with the spherical mechanism robot assembly 10. As shown in FIG. 10, the confined space operations 88 comprise installing 88a a fastener element 126, drilling 88b the fastener element 126, removing 88c the fastener element 126, sealing 88d around the fastener element 126 with a sealant 128, painting 88e one or more portions 122a (see FIG. 8C) of the interior 122 (see FIG. 8C) of the confined space 86 (see FIG. 8C) with a paint 130, inspecting 88f one or more portions 122a of the interior 122 of the confined space 86, recording 88g one or more images 132, such as photographs or digital images, with a camera 134, or other optical device, of one or more portions 122a of the interior 122 of the confined space 86, or another suitable confined space operation. As shown in FIG. 10, the fastener element 126 comprises one or more of, a bolt 126a, a collar 126b, a swaged collar 126c, a nut 126d, a screw 126e, or another suitable fastener element. As shown in FIG. 10, the one or more confined space operations 88 preferably comprise aircraft assembly operations 90.

Figure 11:
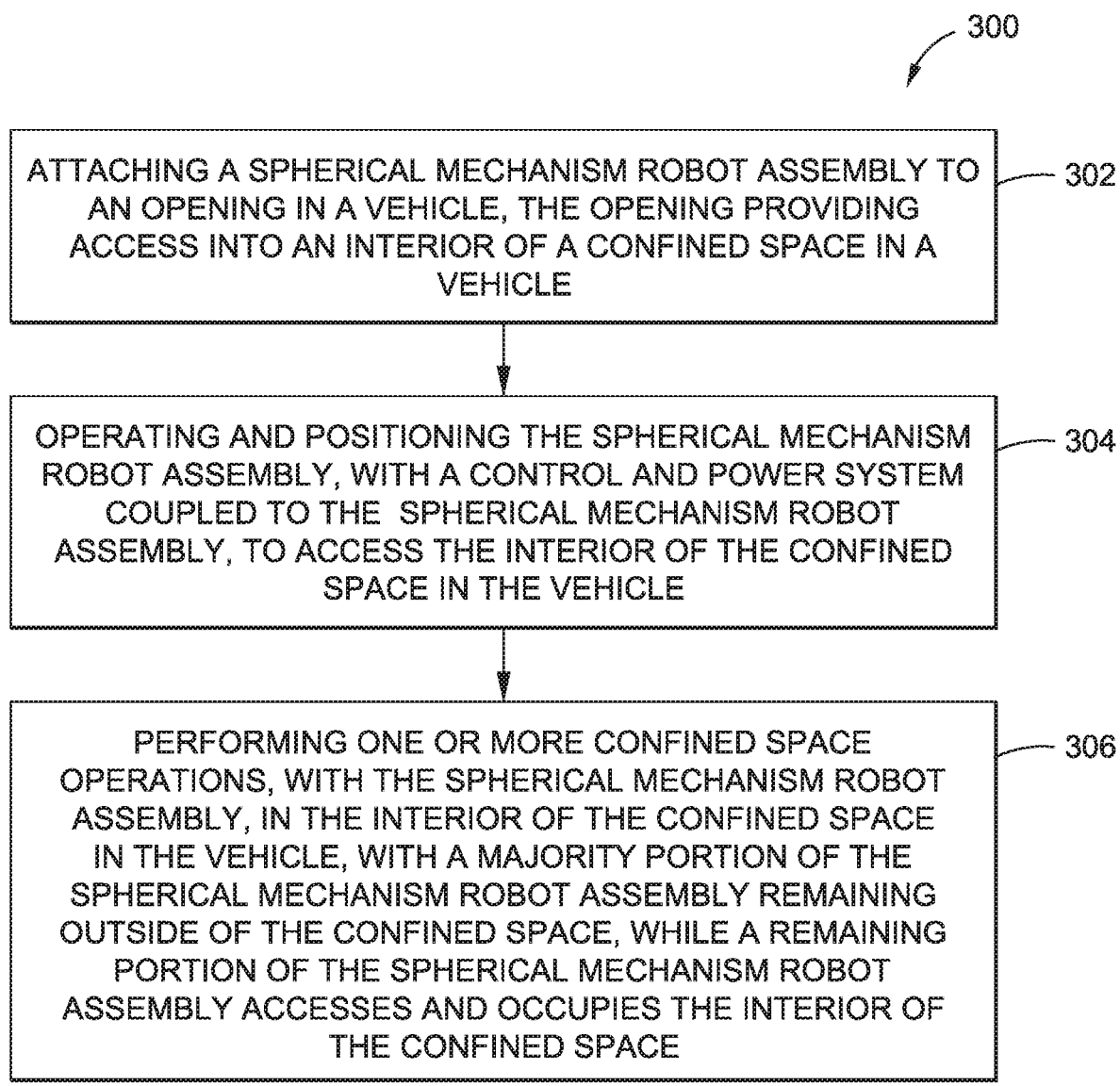
FIG. 11 is an illustration of a flow diagram showing a version of a method of the disclosure.

Now referring to FIG. 11, in another version there is provided a method 300 for accessing the confined space 86 (see FIGS. 8A-8C) in the vehicle 80 (see FIGS. 8A, 9), to perform the one or more confined space operations 88 (see FIG. 10) in the vehicle 80. FIG. 11 is an illustration of a flow diagram showing a version of the method 300 of the disclosure.

As shown in FIG. 11, the method 300 comprises the step of attaching 302 the spherical mechanism robot assembly 10 (see FIGS. 1A-1H) to the opening 16 (see FIGS. 1A-1H, 8A-8C) in the vehicle 80 (see FIGS. 8A, 9). The opening 16 provides access into the interior 122 (see FIGS. 8A-8C) of the confined space 86 (see FIGS. 8A-8C) in the vehicle 80.

As discussed in detail above, the spherical mechanism robot assembly 10 (see FIGS. 1A-1H) comprises the base structure 20 (see FIGS. 1A-1G) configured for attachment to the opening 16. The base structure 20 (see FIGS. 1A, 2A-2C) preferably comprises the attachment device 22 (see FIGS. 1H, 2A), such as in the form of the clamp device 22a (see FIGS. 1H, 2A).

As discussed above, the spherical mechanism robot assembly 10 (see FIGS. 1A-1H) further comprises the spherical mechanism structure 30 (see FIGS. 1A, 8C) having the first end 34a (see FIGS. 1G, 8C) attached to the base structure 20, and having the second end 34b (see FIGS. 1A, 8C) attached to the end effector 70 (see FIGS. 1A, 8C). The spherical mechanism structure 30 comprises the plurality of mechanical links 38 (see FIG. 1A). The plurality of mechanical links 38 comprises the fixed link 40 (see FIGS. 1A-1H), and the plurality of movable links 42 (see FIGS. 1A, 1H). The plurality of movable links 42 preferably comprises four (4) movable links 42, including the first movable link 42a (see FIGS. 1A-1H), the second movable link 42b (see FIGS. 1A-1H), the third movable link 42c (see FIGS. 1A-1H), and the fourth movable link 42d (see FIGS. 1A-1H). However, the plurality of movable links 42 may number more than four (4) movable links 42, as needed.

As discussed above, the spherical mechanism structure 30 (see FIG. 1A) further comprises the plurality of joints 44 (see FIG. 1G) coupling the plurality of mechanical links 38 together. Preferably, the plurality of joints 44 comprise five (5) joints 44, including the first joint 44a (see FIGS. 1A, 1G), the second joint 44b (see FIGS. 1A, 1G), the third joint 44c (see FIGS. 1A, 1G), the fourth joint 44d (see FIGS. 1A, 1G), and the fifth joint 44e (see FIGS. 1A, 1G). However, the plurality of joints 44 may number more than five (5) joints 44, as needed.

As discussed above, the spherical mechanism structure 30 further comprises the plurality of actuators 50 (see FIG. 1G) comprising one or more actuators 50 coupled at each joint 44 of the plurality of joints 44. The plurality of actuators 50 preferably comprise the plurality of rotary actuators 52 (see FIG. 1G), and at least one linear actuator 54 (see FIG. 1G). Preferably, the plurality of rotary actuators 52 comprise five (5) rotary actuators 52, including the first rotary actuator 52a (see FIG. 1G), the second rotary actuator 52b (see FIG. 1G), the third rotary actuator 52c (see FIG. 1G), the fourth rotary actuator 52d (see FIG. 1G), and the fifth rotary actuator 52e (see FIG. 1G). However, the plurality of rotary actuators 52 may number more than five (5) rotary actuators 52, as needed. The spherical mechanism structure 30 further comprises the end effector 70 (see FIGS. 1A-1H) attached to the second end 34b (see FIGS. 1A, 8C) of the spherical mechanism structure 30 (see FIGS. 1A, 8C).

The step of attaching 302 (see FIG. 11) the spherical mechanism robot assembly 10 to the opening 16 (see FIGS. 1A, 8A) further comprises attaching the spherical mechanism robot assembly 10 to the access port 18 (see FIGS. 1A, 8A) formed in one of, the aircraft wing 92 (see FIGS. 8A, 9), for example, the wing skin panel 106 (see FIGS. 8A-8C, 9) of the aircraft wing 92, the horizontal stabilizer 98 (see FIG. 9), for example, the horizontal stabilizer panel 108 (see FIG. 9) of the horizontal stabilizer 98, the vertical stabilizer 102 (see FIG. 9), for example, the vertical stabilizer panel 110 (see FIG. 9) of the vertical stabilizer 102, or formed in another suitable panel 14 (see FIGS. 1A, 8A).

The step of attaching 302 (see FIG. 11) the spherical mechanism robot assembly 10 to the opening 16 further comprises attaching the spherical mechanism robot assembly 10 comprising the spherical mechanism structure 30 (see FIGS. 1A, 8C) having the spherical mechanism pivot point 32 (see FIGS. 1A, 1G) positioned in the geometric plane 28 (see FIG. 1A) of the opening 16 (see FIG. 1A), and intersecting rotation axes 63, 64, 65 (see FIG. 1A) of the spherical mechanism structure 30 at the spherical mechanism pivot point 32, to allow the plurality of mechanical links 38 to pivot around the spherical mechanism pivot point 32, relative to each other and to the confined space 86.

As shown in FIG. 11, the method 300 further comprises the step of operating and positioning 304 the spherical mechanism robot assembly 10, with the control and power system 140 (see FIG. 8A) coupled to the spherical mechanism robot assembly 10, to access the interior 122 (see FIGS. 8A-8C) of the confined space 86 (see FIGS. 8A-8C) in the vehicle 80 (see FIGS. 8A, 9). As discussed in detail above, and as shown in FIG. 8A, the control and power system 140 is coupled to the spherical mechanism robot assembly 10, via one or more connection elements 142, such as the control tether 144, or another suitable connection element 142. As further shown in FIG. 8A, the control and power system 140 comprises the controller 146, such as the remote controller 146a, for example, the programmable logic controller (PLC) 146b, comprises the computer 148, the processor 150, one or more storage devices 152, one or more software programs 154, and one or more power supplies 156. The system kinematics of the spherical mechanism robot assembly 10, and the geometry 66 (see FIG. 8C) of the structure 84 (see FIG. 8C), such as the aircraft structure 84a (see FIG. 8C), for example, the aircraft wing 92 (see FIGS. 8A, 9), the horizontal stabilizer 98 (see FIG. 9), the vertical stabilizer 102 (see FIG. 9), or another suitable aircraft structure, are input into the controller 146, such as the PLC 146b, to operate and move the plurality of actuators 50 (see FIG. 1G), to move the end effector 70 (see FIGS. 1A, 8C) to a desired position and location.

The step of operating and positioning 304 (see FIG. 11) the spherical mechanism robot assembly 10, to access the interior 122 (see FIGS. 8A-8C) of the confined space 86 (see FIGS. 8A-8C) in the vehicle 80 (see FIGS. 8A, 9), further comprises operating and positioning the spherical mechanism robot assembly 10, to access the interior 122 of the confined space 86 comprising the aircraft wing confined space 86a (see FIGS. 8A, 9), the horizontal stabilizer confined space 86b (see FIG. 9), the vertical stabilizer confined space 86c (see FIG. 9), or another suitable confined space, of the vehicle 80 (see FIGS. 8A, 9) comprising the aircraft 82a (see FIGS. 8A, 9).

As shown in FIG. 11, the method 300 further comprises the step of performing 306 the one or more confined space operations 88 (see FIG. 10), with the spherical mechanism robot assembly 10, in the interior 122 (see FIGS. 8A-8C) of the confined space 86 (see FIGS. 8A-8C) in the vehicle 80 (see FIGS. 8A, 9), with a majority portion 136 (see FIG. 8C), of the spherical mechanism robot assembly 10 (see FIG. 8C) remaining outside of the confined space 86, while a remaining portion 138 (see FIG. 8C) of the spherical mechanism robot assembly 10 (see FIG. 8C) accesses and occupies the interior 122 (see FIG. 8C) of the confined space 86 (see FIG. 8C).

The step of performing 306 the one or more confined space operations 88 (see FIG. 10) further comprises performing the one or more confined space operations 88 comprising one or more of, installing 88a (see FIG. 10) a fastener element 126 (see FIGS. 8B, 10), drilling 88b (see FIG. 10) the fastener element 126, removing 88c (see FIG. 10) the fastener element 126, sealing 88d (see FIG. 10) around the fastener element 126 with a sealant 128 (see FIG. 10), painting 88e (see FIG. 10) one or more portions 122a (see FIG. 8C) of the interior 122 (see FIGS. 8A-8C) of the confined space 86 (see FIGS. 8A-8C) with a paint 130 (see FIG. 10), inspecting 88f (see FIG. 10) one or more portions 122a of the interior 122 of the confined space 86, and recording 88g (see FIG. 10) one or more images 132 (see FIG. 10) with a camera 134 (see FIG. 10) of one or more portions 122a of the interior 122 of the confined space 86. The one or more confined space operations 88 are not limited to these confined space operations 88 and may comprise other suitable confined space operations.

Figure 12:
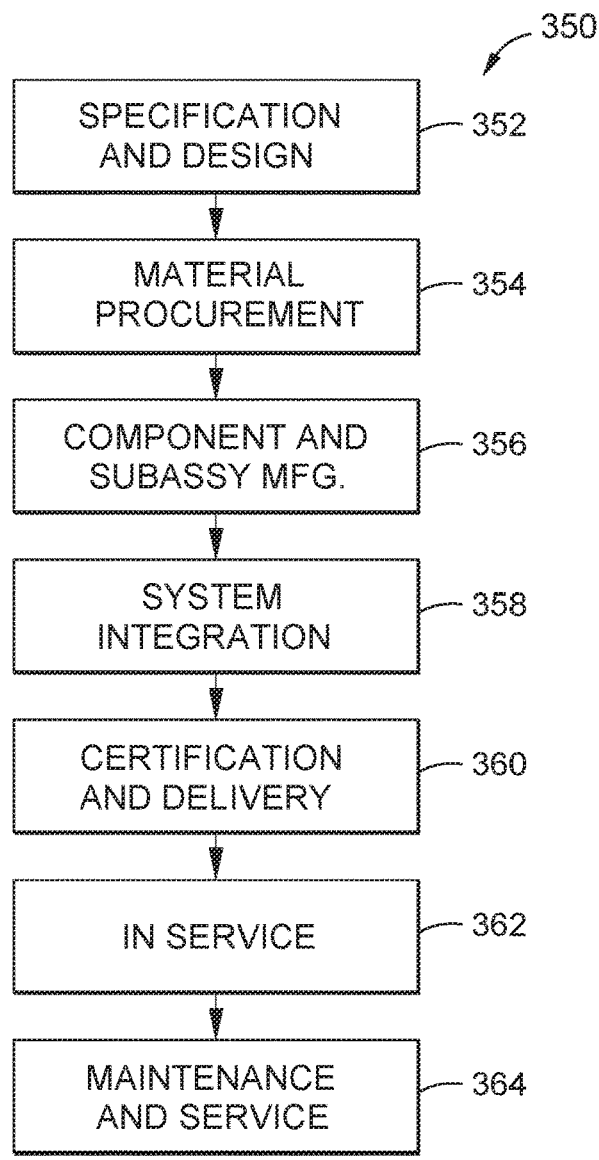
FIG. 12 is an illustration of a flow diagram of an aircraft manufacturing and service method.
Figure 13:
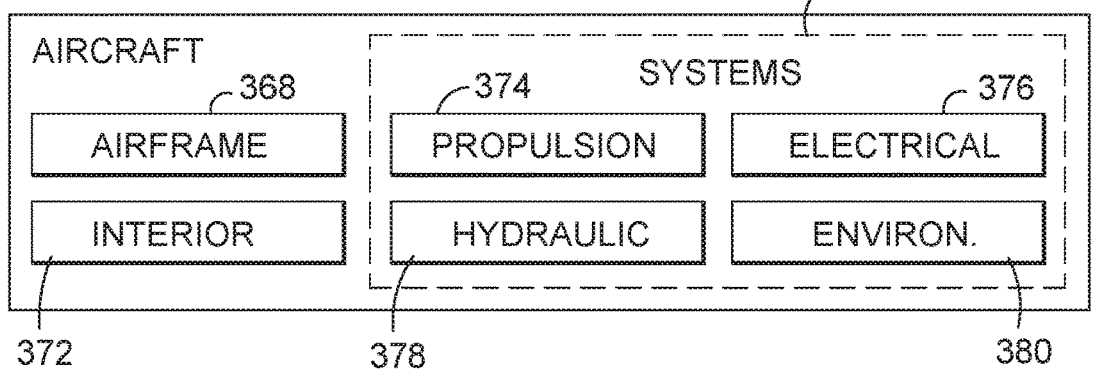
FIG. 13 is an illustration of a block diagram of an aircraft.

Now referring to FIGS. 12 and 13, FIG. 12 is an illustration of a flow diagram of an aircraft manufacturing and service method 350, and FIG. 13 is an illustration of a block diagram of an aircraft 366. Referring to FIGS. 12 and 13, embodiments of the disclosure may be described in the context of the aircraft manufacturing and service method 350 as shown in FIG. 12, and the aircraft 366 as shown in FIG. 13.

During pre-production, exemplary aircraft manufacturing and service method 350 may include specification and design 352 of the aircraft 366 and material procurement 354. During manufacturing, component and subassembly manufacturing 356 and system integration 358 of the aircraft 366 takes place. Thereafter, the aircraft 366 may go through certification and delivery 360 in order to be placed in service 362. While in service 362 by a customer, the aircraft 366 may be scheduled for routine maintenance and service 364 (which may also include modification, reconfiguration, refurbishment, and other suitable services).

Each of the processes of the aircraft manufacturing and service method 350 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 12, the aircraft 366 produced by the exemplary aircraft manufacturing and service method 350 may include an airframe 368 with a plurality of systems 370 and an interior 372. Examples of the plurality of systems 370 may include one or more of a propulsion system 374, an electrical system 376, a hydraulic system 378, and an environmental system 380. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 350. For example, components or subassemblies corresponding to component and subassembly manufacturing 356 may be fabricated or manufactured in a manner similar to components or subassemblies produced while the aircraft 366 is in service 362. Also, one or more apparatus embodiments, method embodiments, or a combination thereof, may be utilized during component and subassembly manufacturing 356 and system integration 358, for example, by substantially expediting assembly of or reducing the cost of the aircraft 366. Similarly, one or more of apparatus embodiments, method embodiments, or a combination thereof, may be utilized while the aircraft 366 is in service 362, for example and without limitation, to maintenance and service 364.

Disclosed versions of the spherical mechanism robot assembly 10 (see FIGS. 1A-1H), the spherical mechanism robot system 12 (see FIG. 8A), and the method 300 (see FIG. 11) provide a fully automated device, system, and method with remote controls for accessing one or more confined spaces 86 (see FIG. 8A-8C) in vehicles 80 (see FIGS. 8A, 9), such as air vehicles 82 (see FIGS. 8A, 9), for example, aircraft 82*a* (see FIGS. 8A, 9), to perform, or to be configured to perform, one or more confined space operations 88 (see FIG. 10), such as installing 88*a* (see FIG. 10), drilling 88*b* (see FIG. 10), and removing 88*c* (see FIG. 10) fastener elements 126 (see FIGS. 8B, 10), sealing 88*d* (see FIG. 10) around the fastener elements 126 with a sealant 128 (see FIG. 10), painting 88*e* (see FIG. 10) one or more portions 122*a* (see FIG. 8C) of the interior 122 (see FIG. 8C) of the confined space 86 (see FIG. 8C) with a paint 130 (see FIG. 10), inspecting 88*f* (see FIG. 10) one or more portions 122*a* of the interior 122 of the confined space 86 for quality inspections, and recording 88*g* (see FIG. 10) one or more images 132 (see FIG. 10) with a camera 134 (see FIG. 10), or other optical device, of one or more portions 122*a* of the interior 122 of the confined space 86. The spherical mechanism robot assembly 10 and the spherical mechanism robot system 12 are capable of complex three-dimensional motions.

In particular, disclosed versions of the spherical mechanism robot assembly 10 (see FIGS. 1A-1H), the spherical mechanism robot system 12 (see FIG. 8A), and the method 300 (see FIG. 11) utilize spherical mechanism robotics in aircraft assembly operations 90 (see FIG. 10), such as aircraft wing assembly, aircraft horizontal stabilizer assembly, aircraft vertical stabilizer assembly, and assembly of other aircraft structures 84*a* (see FIG. 8C). The spherical mechanism robot assembly 10 (see FIGS. 1A-1H) is preferably a lightweight and small robotic assembly of preferably about 30 (thirty) pounds or less in weight, for example, from 10 (ten) pounds to 30 (thirty) pounds in weight, that may be attached to an access port 18 (see FIGS. 8A-8C), such as an underwing access port 18*a* (see FIGS. 8A-8B), formed in a panel 14 (see FIGS. 8A-8C) of the structure 84 (see FIGS. 8A, 8C), such as the aircraft structure 84*a* (see FIGS. 8A, 8C). The spherical mechanism robot assembly 10 (see FIGS. 1A-1H) may be manually lifted up, attached to the opening 16 (see FIGS. 1A, 8A), and manually tightened to secure the spherical mechanism robot assembly 10 (see FIGS. 1A-1H) to the vehicle 80. The spherical mechanism robot assembly 10 uses optimized spherical mechanism angles 62 (see FIG. 1A) between the plurality of mechanical links 38 (see FIG. 1A), such as the plurality of movable links 42 (see FIG. 1A).

In addition, disclosed versions of the spherical mechanism robot assembly 10 (see FIGS. 1A-1H), the spherical mechanism robot system 12 (see FIG. 8A), and the method 300 (see FIG. 11) allow for placement of the plurality of actuators 50 (see FIG. 1G) into the spherical mechanism robot assembly 10 without creating interference of the end effector 70 (see FIGS. 1A, 8C) and one or more tools 72 (see FIG. 8C) inside the structure 84, such as the aircraft structure 84*a*, for example, the aircraft wing 92. The plurality of actuators 50 (see FIG. 1G) are preferably mounted at the plurality of joint pivot points 48 (see FIG. 1G) of the plurality of joints 44 (see FIG. 1G), to minimize the amount of equipment that is inside the structure 84, such as the aircraft structure 84*a*, for example, the aircraft wing 92 (see FIGS. 8A, 9). The only components or portion 10*a* (see FIG. 8C) of the spherical mechanism robot assembly 10 that are positioned in and access the interior 122 (see FIGS. 8A-8C) of the confined space 86 (see FIGS. 8A-8C) of the structure 84, such as the aircraft structure 84*a*, for example, the aircraft wing 92, are preferably the fourth movable link 42*d* (see FIG. 8C), the end effector 70 (see FIG. 8C), and a portion of the third movable link 42*c* (see FIG. 8C), such as about a ⅓ (one-third) portion, or less. At least a ⅔ (two-thirds) portion 43 (see FIG. 8C) of the third movable link 42*c*, as well as the first movable link 42*a*, the second movable link 42*b*, and the fixed link 40 are positioned outside the structure 84 (see FIG. 8C) and at the exterior 120 (see FIG. 8C) of the structure 84. The base structure 20 (see FIGS. 1A-1G, 8A) is preferably rigidly attached to the edge 24 (see FIGS. 1A, 8A) of the opening 16 (see FIGS. 1A, 8A), such as the access port 18 (see FIGS. 1A, 8A).

Thus, disclosed versions of the spherical mechanism robot assembly 10 (see FIGS. 1A-1H), the spherical mechanism robot system 12 (see FIG. 8A), and the method 300 (see FIG. 11) focus on keeping the majority of the robot, that is, the spherical mechanism robot assembly 10, outside of the work space, and reach in with the end effector 70 and one or more tools 72 to access the interior 122 (see FIGS. 8A-8C) of the confined space 86 (see FIGS. 8C-8C) of the structure 84 (see FIG. 8C), such as the aircraft structure 84*a* (see FIG. 8C), for example, the wingbox 94 (see FIG. 8C), of the aircraft wing 92 (see FIG. 8A), without putting more equipment inside the structure 84, such as the aircraft structure 84*a*, for example, the wingbox 94, of the aircraft wing 92. The majority of the actuators 50 (see FIG. 1G) and the movable links 42 (see FIG. 1G), such as the robot links, are mounted outside of the structure 84, such as the aircraft structure 84*a*, for example the aircraft wing 92, rather than inside the structure 84, such as the aircraft structure 84*a*, for example, the aircraft wing 92. Accordingly, the spherical mechanism robot assembly 10 enables a large work space with a majority portion 136 (see FIG. 8C) of the spherical mechanism robot assembly 10, such as 60% to 90%, of the spherical mechanism robot assembly 10, remaining outside of the confined space 86 (see FIGS. 8A-8C), while a remaining portion 138 (see FIG. 8C) of the spherical mechanism robot assembly 10, such as 10% to 40%, of the spherical mechanism robot assembly 10, accesses and occupies the interior 122 (see FIGS. 8A-8C) of the confined space 86 (see FIGS. 8A-8C), in the aircraft wing 92 (see FIG. 8A) of the vehicle 80 (see FIG. 8A), such as the aircraft 82*a* (see FIG. 8A).

In addition, the system kinematics of the spherical mechanism robot assembly 10 enable a remote center or spherical mechanism pivot point 32 (see FIGS. 1A, 1G) located at the intersection of the rotation axes 63, 64, 65 (see FIG. 1A) of the spherical mechanism robot assembly 10. The rotation axes 63, 64, 65 (see FIG. 1A) of the spherical mechanism structure 30 preferably intersect at the spherical mechanism pivot point 32 (see FIG. 1A), to allow the plurality of mechanical links 38 to pivot around the spherical mechanism pivot point 32, relative to each other and to the confined space 86.

In aircraft assembly operations 90 (see FIG. 10) and applications, access ports 18 (see FIG. 1A, 8A), such as underwing access ports 18*a* (see FIG. 8A), may be used as the spherical mechanism pivot point 32 of the spherical mechanism robot assembly 10, with minimal equipment or portions of the spherical mechanism robot assembly 10, for example, less than 40%, such as 10% to 40%, of the spherical mechanism robot assembly 10, needed inside the confined space 86 (see FIGS. 8A-8C), such as the wingbox 94 (see FIGS. 8B-8C). The spherical mechanism robot assembly 10 provides an additional degree of freedom (e.g., (alpha four ($\alpha_4$)) (see FIG. 1A)), such as a fourth rotation actuation 58*d* (see FIG. 1A), to enable a working capability and performance of the confined space operations 88 (see FIG. 10) on the interior of the upper wing skin panels 106*a*

(see FIGS. 8B-8C), and the interior of the lower wing skin panels 106b (see FIGS. 8A-8C), and in particular, to enable tasks to be performed on the lower wing skin panel 106b (see FIG. 8A) of the aircraft wing 92 (see FIG. 8A).

The spherical mechanism robot assembly 10 (see FIGS. 1A-1H, 8A) may be attached or clamped to the opening 16 (see FIG. 8A), such as the access port 18 (see FIG. 8A), of the panel 14 (see FIG. 8C) of the aircraft wing 92 (see FIG. 8A). The system kinematics are preferably input or loaded into the controller 146 (see FIG. 8A), such as the programmable logic controller (PLC) 146b (see FIG. 8A), or similar, along with the geometry 66 (see FIG. 8C) of the structure 84 (see FIG. 8C), such as the aircraft structure 84a, for example, the aircraft wing 92. In one version of the spherical mechanism robot system 12, the controller 146 moves the six (6) actuators 50 to move the end effector 70 in the desired location. In an example, the end effector 70 is attached, via the quick disconnect connector element 74a (see FIG. 8C), such that different confined space operations 88 (see FIG. 10) may be performed effectively. The plurality of mechanical links 38 (see FIG. 1A) are preferably made of high strength aluminum stock material (e.g., 7000 series), or another suitable metal material, for weight and rigidity requirements. The plurality of actuators 50 (see FIG. 1G) may comprise a plurality of rotary actuators 52 (see FIG. 1G) and at least one linear actuator 54 (see FIG. 1G).

Further, disclosed versions of the spherical mechanism robot assembly 10 (see FIGS. 1A-1H), the spherical mechanism robot system 12 (see FIG. 8A), and the method 300 (see FIG. 11) remove or avoid the need for a human operator to crawl into the confined spaces 86 (see FIGS. 8A-8C) through the openings 16 (see FIGS. 8A-8C), such as the access ports 18 (see FIGS. 8A-8C), to perform the confined space operations 88 (see FIG. 10). Moreover, disclosed versions of the spherical mechanism robot assembly 10 (see FIGS. 1A-1H), the spherical mechanism robot system 12 (see FIG. 8A), and the method 300 (see FIG. 11) allow for an automated system 13 (see FIG. 8A) that may be used in air vehicles 82, such as aircraft 82a, regardless of the size of the aircraft wings 92 (see FIG. 8A). For example, aircraft 82a that have aircraft wings 92 that are small in size and width may make it difficult or not possible for human operators to access and crawl inside such aircraft wings 92, due to size and space constraints. Thus, the spherical mechanism robot assembly 10 and the spherical mechanism robot system 12 remove the human operator from confined space situations by robotically and automatically performing the confined space operations 88 (see FIG. 10), such as the aircraft assembly operations 90 (see FIG. 10). By applying the spherical mechanism robot assembly 10 technology to aircraft assembly operations 90 (see FIG. 10), such as in-tank wing assembly operations, for example, fastening, drilling, sealing, inspecting, and other operations, tooling and human operators may be removed from the confined spaces 86, to reduce ergonomic challenges and decrease the time to perform such confined space operations. Reducing the time to perform the confined space operations using an automated system 13 (see FIG. 8A) may improve the build rates of the aircraft 82a.

Many modifications and other versions or embodiments of the disclosure will come to mind to one skilled in the art to which this disclosure pertains having the benefit of the teachings presented in the foregoing descriptions and the associated drawings. The versions or embodiments described herein are meant to be illustrative and are not intended to be limiting or exhaustive. Although specific terms are employed herein, they are used in a generic and descriptive sense only and not for purposes of limitation.

What is claimed is:

1. A spherical mechanism robot assembly for accessing a confined space in a vehicle, to perform one or more confined space operations in the vehicle, the spherical mechanism robot assembly comprising:
    a base structure configured for attachment to the vehicle;
    a spherical mechanism structure having a first end attached to the base structure, and having a second end, the spherical mechanism structure comprising a plurality of mechanical links, a plurality of joints coupling the plurality of mechanical links together, and a plurality of actuators comprising one or more actuators coupled at each joint of the plurality of joints; and
    an end effector attached to the second end of the spherical mechanism structure,
    wherein the base structure, the spherical mechanism structure, and the end effector are assembled to form the spherical mechanism robot assembly, with the spherical mechanism robot assembly configured such that a majority portion of the spherical mechanism robot assembly remains outside of the confined space, while a remaining portion of the spherical mechanism robot assembly accesses and occupies the confined space in the vehicle, to perform the one or more confined space operations in the vehicle.

2. The spherical mechanism robot assembly of claim 1, wherein the base structure is configured for attachment to an opening in the vehicle, the opening providing access for the remaining portion of the spherical mechanism robot assembly into the confined space.

3. The spherical mechanism robot assembly of claim 1, wherein the spherical mechanism structure has a spherical mechanism pivot point positioned in a geometric plane of the opening, and further wherein rotation axes of the spherical mechanism structure intersect at the spherical mechanism pivot point, allowing the plurality of mechanical links to pivot around the spherical mechanism pivot point, relative to each other and to the confined space.

4. The spherical mechanism robot assembly of claim 1, wherein the spherical mechanism structure has optimized spherical mechanism angles between the plurality of mechanical links, the optimized spherical mechanism angles based on a geometry of a structure, including the confined space, that the spherical mechanism robot assembly is used in to perform the one or more confined space operations.

5. The spherical mechanism robot assembly of claim 1, wherein the spherical mechanism robot assembly is configured to perform the one or more confined space operations comprising one or more of installing a fastener element, drilling the fastener element, removing the fastener element, sealing around the fastener element with a sealant, painting one or more portions of an interior of the confined space with a paint, inspecting one or more portions of the interior of the confined space, and recording one or more images with a camera of one or more portions of the interior of the confined space.

6. The spherical mechanism robot assembly of claim 1, wherein the base structure comprises a clamp device.

7. The spherical mechanism robot assembly of claim 1, wherein the plurality of mechanical links of the spherical mechanism structure comprise a fixed link, and a plurality of movable links comprising four (4) movable links.

8. The spherical mechanism robot assembly of claim 7, wherein the base structure, the fixed link, a first movable link, a second movable link, and at least a $\frac{2}{3}$ (two-thirds)

portion of a third movable link are positioned outside of the confined space during performance of the confined space operations in an interior of the confined space in the vehicle.

9. The spherical mechanism robot assembly of claim 1, wherein the plurality of actuators comprise a plurality of rotary actuators, and at least one linear actuator.

10. The spherical mechanism robot assembly of claim 1, wherein the spherical mechanism robot assembly is coupled to a control and power system for operating and positioning the spherical mechanism robot assembly, with respect to the confined space.

11. A spherical mechanism robot system for accessing a confined space in an aircraft, to perform one or more confined space operations in the aircraft, the spherical mechanism robot system comprising:
    a spherical mechanism robot assembly comprising:
        a base structure configured for attachment to an access port in the aircraft;
        a spherical mechanism structure having a first end attached to the base structure, and having a second end, the spherical mechanism structure comprising a plurality of mechanical links, a plurality of hinged joints coupling the plurality of mechanical links together, and a plurality of actuators with one or more actuators coupled at each hinged joint of the plurality of hinged joints; and
        an end effector attached to the second end of the spherical mechanism structure;
    a tool configured for attachment to the end effector; and
    a control and power system coupled to the spherical mechanism robot assembly, the control and power system configured to operate the spherical mechanism robot assembly and position the spherical mechanism robot assembly in a plurality of positions with respect to the access port and the confined space,
    wherein the spherical mechanism robot system enables the spherical mechanism robot assembly to access an interior of the confined space in the aircraft, and the spherical mechanism robot assembly is configured such that a majority portion of the spherical mechanism robot assembly remains outside of the confined space, while a remaining portion of the spherical mechanism robot assembly accesses and occupies the confined space in the aircraft, to perform the one or more confined space operations in the aircraft.

12. The spherical mechanism robot system of claim 11, wherein the base structure is configured for attachment to the access port formed through an aircraft structure comprising one of an aircraft wing, a horizontal stabilizer, and a vertical stabilizer.

13. The spherical mechanism robot system of claim 11, wherein the spherical mechanism robot assembly is configured to perform the one or more confined space operations comprising one or more of installing a fastener element, drilling the fastener element, removing the fastener element, sealing around the fastener element with a sealant, painting one or more portions of the interior of the confined space with a paint, inspecting one or more portions of the interior of the confined space, and recording one or more images with a camera of one or more portions of the interior of the confined space.

14. The spherical mechanism robot system of claim 11, wherein the base structure comprises a clamp device; wherein the plurality of mechanical links comprise a fixed link and a plurality of movable links comprising four (4) movable links; and
wherein the plurality of actuators comprise a plurality of rotary actuators and at least one linear actuator.

15. The spherical mechanism robot system of claim 11, wherein the spherical mechanism structure has a spherical mechanism pivot point positioned in a geometric plane of the access port, and further wherein rotation axes of the spherical mechanism structure intersect at the spherical mechanism pivot point, allowing the plurality of mechanical links to pivot around the spherical mechanism pivot point, relative to each other and to the confined space.

16. A method for accessing a confined space in a vehicle, to perform one or more confined space operations in the vehicle, the method comprising the steps of:
    attaching a spherical mechanism robot assembly to an opening in the vehicle, the opening providing access in to an interior of the confined space in the vehicle, the spherical mechanism robot assembly comprising:
        a base structure configured for attachment to the opening;
        a spherical mechanism structure having a first end attached to the base structure, and having a second end, the spherical mechanism structure comprising a plurality of mechanical links, a plurality of joints coupling the plurality of mechanical links together, and a plurality of actuators comprising one or more actuators coupled at each joint of the plurality of joints; and
        an end effector attached to the second end of the spherical mechanism structure;
    operating and positioning the spherical mechanism robot assembly, with a control and power system coupled to the spherical mechanism robot assembly, to access the interior of the confined space in the vehicle; and
    performing the one or more confined space operations, with the spherical mechanism robot assembly, in the interior of the confined space in the vehicle, with a majority portion of the spherical mechanism robot assembly remaining outside of the confined space, while a remaining portion of the spherical mechanism robot assembly accesses and occupies the interior of the confined space.

17. The method of claim 16, wherein attaching the spherical mechanism robot assembly to the opening further comprises attaching the spherical mechanism robot assembly to an access port formed in one of, an aircraft wing, a horizontal stabilizer, and a vertical stabilizer of an aircraft.

18. The method of claim 16, wherein attaching the spherical mechanism robot assembly to the opening further comprises attaching the spherical mechanism robot assembly comprising the spherical mechanism structure having a spherical mechanism pivot point positioned in a geometric plane of the opening, and intersecting rotation axes of the spherical mechanism structure at the spherical mechanism pivot point, to allow the plurality of mechanical links to pivot around the spherical mechanism pivot point, relative to each other and to the confined space.

19. The method of claim 16, wherein operating and positioning the spherical mechanism robot assembly, to access the interior of the confined space in the vehicle, further comprises operating and positioning the spherical mechanism robot assembly, to access the interior of the confined space comprising one of, an aircraft wing confined space, a horizontal stabilizer confined space, and a vertical stabilizer confined space, of the vehicle comprising an aircraft.

20. The method of claim 16, wherein performing the one or more confined space operations further comprises performing the one or more confined space operations comprising one or more of installing a fastener element, drilling the fastener element, removing the fastener element, sealing around the fastener element with a sealant, painting one or more portions of the interior of the confined space with a paint, inspecting one or more portions of the interior of the confined space, and recording one or more images with a camera of one or more portions of the interior of the confined space.

* * * * *